United States Patent
Kim

(10) Patent No.: US 9,720,498 B2
(45) Date of Patent: Aug. 1, 2017

(54) CONTROLLING A VEHICLE

(71) Applicant: LG ELECTRONICS INC., Seoul (KR)

(72) Inventor: Sunryang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 14/832,084

(22) Filed: Aug. 21, 2015

(65) Prior Publication Data

US 2016/0176372 A1    Jun. 23, 2016

(30) Foreign Application Priority Data

Dec. 22, 2014  (KR) .......................... 10-2014-0186342

(51) Int. Cl.
*G06F 3/01*      (2006.01)
*B60K 35/00*    (2006.01)
(Continued)

(52) U.S. Cl.
CPC .............. *G06F 3/013* (2013.01); *B60K 35/00* (2013.01); *E05F 15/73* (2015.01); *G06K 9/00604* (2013.01); *B60J 7/057* (2013.01); *B60R 16/0373* (2013.01); *E05Y 2400/85* (2013.01); *E05Y 2400/858* (2013.01); *E05Y 2900/542* (2013.01); *E05Y 2900/55* (2013.01)

(58) Field of Classification Search
CPC .......... G06F 3/013; B60K 35/00; E05F 15/73; G06K 9/00604; B60J 7/057; E05Y 2900/55; E05Y 2900/542; E05Y 2400/85; E05Y 2400/858; B60R 16/0373
See application file for complete search history.

(56) References Cited

U.S. PATENT DOCUMENTS

| 2013/0185078 A1* | 7/2013 | Tzirkel-Hancock .... G10L 15/22 704/275 |
| 2014/0129082 A1 | 5/2014 | Takahashi et al. |
| 2015/0120151 A1* | 4/2015 | Akay ..................... B60R 25/24 701/49 |

FOREIGN PATENT DOCUMENTS

| JP | S59-102633 | 6/1984 |
| JP | 2012-056359 | 3/2012 |

(Continued)

OTHER PUBLICATIONS

International Search Report and Written Opinion for International Application No. PCT/KR2015/008426, mailed Oct. 29, 2015, 19 pages.

*Primary Examiner* — Rodney Butler
(74) *Attorney, Agent, or Firm* — Fish & Richardson P.C.

(57) ABSTRACT

Systems and techniques are disclosed for controlling a vehicle. A vehicle control apparatus includes a sensing unit that senses an eyeline of a passenger in a vehicle. The vehicle control apparatus also includes a controller. In some implementations, the controller identifies a window of the vehicle that corresponds to the sensed eyeline of the passenger, detects a window control action performed by the passenger, and controls the identified window to open or close based on the window control action performed by the passenger. In some implementations, the controller identifies a device of the vehicle that corresponds to the sensed eyeline of the passenger, and operates the identified device based on the sensed eyeline of the passenger, wherein the identified device is a multimedia device or a navigation device of the vehicle.

20 Claims, 21 Drawing Sheets

(51) Int. Cl.
*G06K 9/00* (2006.01)
*B60R 16/03* (2006.01)
*E05F 15/73* (2015.01)
*B60R 16/037* (2006.01)
*B60J 7/057* (2006.01)

(56) References Cited

FOREIGN PATENT DOCUMENTS

| | | |
|---|---|---|
| JP | 2012-121386 | 6/2012 |
| JP | 5554879 | 6/2014 |
| KR | 10-2010-0120767 | 11/2010 |
| KR | 10-2014-0023488 | 2/2014 |

\* cited by examiner

CONTROLLING A VEHICLE

CROSS-REFERENCE TO RELATED APPLICATIONS

Pursuant to 35 U.S.C. §119(a), this application claims the benefit of an earlier filing date and right of priority to Korean Application No. 10-2014-0186342, filed on Dec. 22, 2014, the contents of which are incorporated by reference herein in their entirety.

TECHNICAL FIELD

This application relates to automated control of a vehicle.

BACKGROUND

Automotive vehicles often provide control components, such as keys or buttons or knobs, that allow a driver or passenger to control various functions of the vehicle. For example, such control components may allow a user to open or close windows of the vehicle, control a music system or navigation system of the vehicle, and/or control operation of the vehicle itself. As the complexity and functionality of vehicles increase, such control components also tend to increase in number and complexity, potentially causing difficulty in usability.

SUMMARY

Techniques according to the present application enables a vehicle control apparatus to allow a user to manipulate various functions executable in a vehicle more simply and easily. In some implementations, such techniques may reduce the need for a large number of keys or buttons provided in a vehicle, and may instead allow a user to manipulate various functions executable in a vehicle more simply and easily.

In one aspect, a vehicle control apparatus is disclosed. The vehicle control apparatus includes a sensing unit configured to sense an eyeline of a passenger in a vehicle. The vehicle control apparatus also includes a controller configured to identify one of a plurality of windows of the vehicle that corresponds to the sensed eyeline of the passenger. The controller detects a window control action performed by the passenger, and controls the identified one of the plurality of windows to open or close based on the window control action performed by the passenger.

In some implementations, the window control action performed by the passenger relates to at least one of a time duration for which the passenger has stared at the one of the plurality windows that corresponds to the eyeline of the passenger, a preset key input applied from the passenger, or a voice command input applied from the passenger. The controller is further configured to grant authority to the passenger to control the one of the plurality of windows that corresponds to the eyeline of the passenger.

In some implementations, the controller is further configured to determine the one of the plurality of windows to be controlled that corresponds to the sensed eyeline of the passenger based on a position of a seat in which the passenger is sitting.

In some implementations, the controller is further configured to control the one of the plurality of windows that corresponds to the eyeline of the passenger to be open or closed based on determining that the passenger has stared at the one of the plurality of windows that corresponds to the eyeline of the passenger for more than a preset first amount of time.

In some implementations, the controller is further configured to, based on determining that a time duration for which the passenger has stared at the one of the plurality of windows that corresponds to the eyeline of the passenger exceeds a preset second amount of time: output an alert message through an audio output unit or a display unit provided in the vehicle, or restrict the passenger from controlling the one of the plurality of windows that corresponds to the eyeline for a predetermined time.

In some implementations, the controller is further configured to control the one of the plurality of windows that corresponds to the eyeline of the passenger to be open or closed based on a touch and drag input applied from the passenger onto the one of the plurality of windows that corresponds to the eyeline of the passenger.

In some implementations, the controller is further configured to control the one of the plurality of windows that corresponds to the sensed eyeline of the passenger to be displayed so that the one of the plurality of windows is distinguishable by the passenger from other windows among the plurality of windows.

In some implementations, the controller is further configured to display the one of the plurality of windows that corresponds to the sensed eyeline of the passenger using video information displayed on a preset region of each of the plurality of windows, or using an optical signal of a light emitting diode (LED) corresponding to each of the plurality of windows.

In some implementations, the plurality of windows includes a sunroof window, a driver's seat side window, a passenger seat side window, a left rear seat side window, and a right rear seat side window.

In some implementations, the controller is further configured to, based on determining that at least two different windows correspond to the sensed eyeline of the passenger, further determine a particular window to be opened or closed based on a key input or a voice command input applied from the passenger.

In some implementations, the controller is further configured to output audio information or video information prompting the passenger to input a key input or a voice command input indicating a selection of one of the plurality of windows to be opened or closed.

In some implementations, the controller is further configured to, based on determining that at least two different windows correspond to the sensed eyeline of the passenger, further determine the particular window to be opened or closed based on a direction in which the passenger is facing.

In some implementations, at least one of the plurality of windows is configured to display video information, and the controller is further configured to display, on the one of the plurality of windows that corresponds to the eyeline of the passenger, preset information related to the vehicle according to the window control action of the passenger.

In some implementations, the window control action of the passenger includes a voice command input requesting preset information related to the vehicle, or an input using at least one key corresponding to the preset information.

In some implementations, the controller is further configured to determine a size of a display region of the identified one of the plurality of windows where the preset information is to be displayed based on an open or closed state of the one of the plurality of windows that corresponds to the eyeline of the passenger.

In some implementations, the controller is further configured to, based on determining that there are at least two passengers in the vehicle: detect eyelines of the at least two passengers; identify at least two windows that correspond to the detected eyelines of the at least two passengers; detect window control actions from the at least two passengers; and display respective information related to the vehicle on each of the at least two windows based on the window control actions from the at least two passengers. The respective information displayed on each of the at least two windows is different information related to the vehicle.

In some implementations, the controller is further configured to, based on determining that an operating speed of the vehicle is less than a threshold speed, control at least one of the plurality of windows to be opened or closed based on determining an eyeline of a driver of the vehicle.

In another aspect, a vehicle control apparatus is disclosed. The vehicle control apparatus includes a sensing unit configured to sense an eyeline of a passenger in the vehicle. The vehicle control apparatus also includes a controller configured to identify one of a plurality of devices of the vehicle that corresponds to the sensed eyeline of the passenger; and operate the identified one of the plurality of devices of the vehicle based on the sensed eyeline of the passenger. The plurality of devices of the vehicle includes at least one multimedia device and at least one navigation device of the vehicle, and the one of the plurality devices that is operated by the controller is a multimedia device or a navigation device of the vehicle.

In some implementations, the controller is further configured to, based on determining that among the plurality of devices, there are two or more different devices that correspond to the eyeline of the passenger, control a particular device among the two or more different devices that correspond to the eyeline of the passenger to have an appearance that differentiates the particular device from other devices among the two or more different devices. The controller is further configured to control an operation of at least one of the two or more different devices that has been selected by the passenger among the plurality of devices.

In another aspect, a method of controlling a vehicle including a plurality of windows is disclosed. The method includes sensing an eyeline of a passenger in the vehicle and identifying, among the plurality of windows of the vehicle, at least one window that corresponds to the sensed eyeline of the passenger. The method further includes detecting a window control action performed by the passenger for controlling at least one of the plurality of windows; and controlling the at least one window that corresponds to the eyeline of the passenger according to the detected window control action. Controlling the at least one window includes at least one of opening or closing the at least one window according to the detected window control action, or displaying preset information related to the vehicle on the at least one window.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below.

Other features will be apparent from the description and drawings, and from the claims. The description and specific examples below are given by way of illustration only, and various changes and modifications will be apparent.

DETAILED DESCRIPTION

Vehicle control techniques are disclosed that enable a user to control functions of a vehicle more easily and simply. In some implementations, a vehicle apparatus may enable a driver or a passenger of the vehicle to control functions of a vehicle based on where the driver or passenger is looking. For example, the vehicle control apparatus may detect an eyeline, or point of gaze, of a driver or passenger to determine which part of the vehicle the driver or passenger is looking at. In addition to the eyeline of the passenger, the vehicle control apparatus may also determine a control action performed by the driver or passenger, such as looking or gazing at a particular part of the vehicle for greater than a certain amount of time, making particular gestures, voice commands, or other actions. The vehicle control apparatus may detect such a control action performed by the driver or passenger to further identify the part of the vehicle or to identify a particular operation to perform using the part of the vehicle that the driver or passenger is looking at.

As such, a vehicle control technology according to the present disclosure enables a vehicle to provide various functions to a user in a more convenient and efficient manner. Such technology may reduce the need for the vehicle to provide a large number of control components, such as keys or buttons or knobs, that, in some implementations, may increase complexity for the user and cause the user to have difficulty in controlling the various functions of the vehicle. Even in vehicles that provide simplified control components, such as a single key or knob that may be controlled to perform a larger number of functions, some users may have difficulty in manipulating the control component, such as the key or knob. Accordingly, techniques according to the present disclosure may enable a vehicle to allow a user to execute various functions of the vehicle in a more convenient manner.

Figure 1:
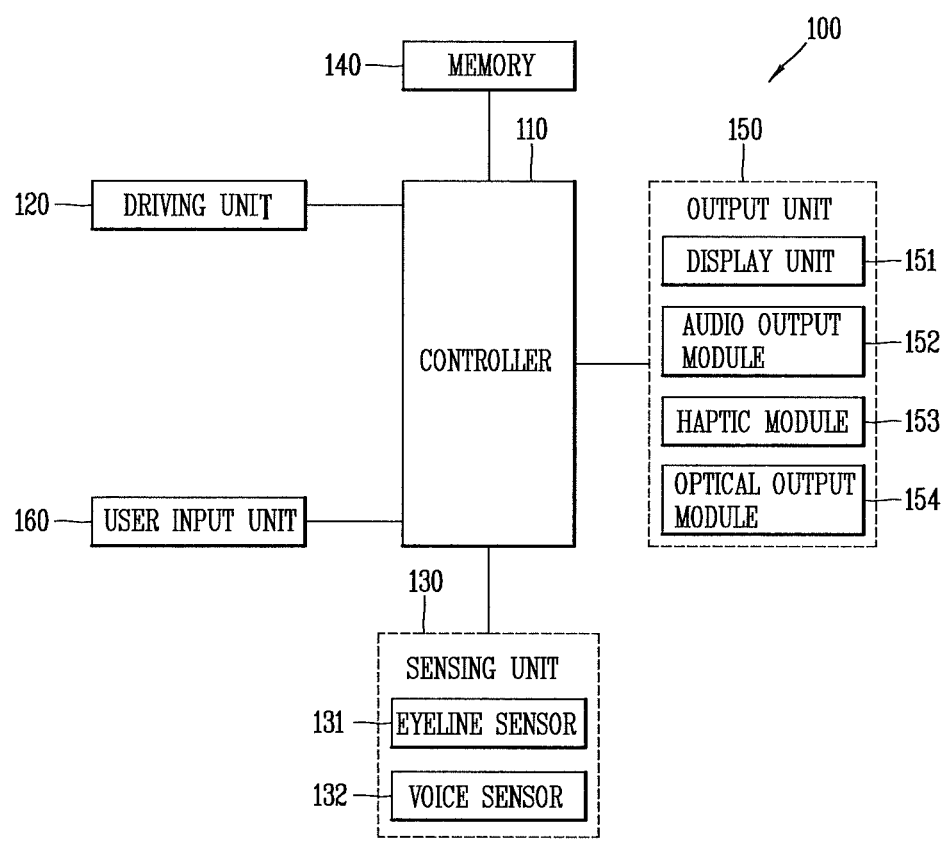
FIG. 1 is a block diagram illustrating an example of a vehicle control apparatus.

FIG. 1 is a block diagram illustrating an example of a vehicle control apparatus.

As shown in FIG. 1, the vehicle control apparatus 100 includes components such as a controller 110, a sensing unit 130 connected to the controller 110, a driving unit 120, a memory 140, and an output unit 150. The vehicle control apparatus 100 may further include a user input unit 160. The vehicle control apparatus 100 may be formed in a body of a vehicle, the body including an outer frame forming appearance of the vehicle, windows, and an inner frame formed so that a passenger can get on the vehicle. It is understood that implementing all of the illustrated components shown in FIG. 1 is not a requirement, and that greater or fewer components may alternatively be implemented.

The sensing unit 130 may be implemented using one or more sensors configured to sense internal information of the vehicle control apparatus 100, the surrounding environment of the vehicle control apparatus 100, user information, and the like. For example, the sensing unit 130 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control apparatus 100 may be configured to utilize information obtained from the sensing unit 130, and in particular, information obtained from one or more sensors of the sensing unit 130, and combinations thereof.

The sensing unit 130 may include at least one sensing region for sensing a user's input. The sensing region may be formed in the body of the vehicle, the body including an outer frame and an inner frame of the vehicle. Such a sensing region may be implemented as a touch screen, etc.

The sensing region may be formed at various parts of the vehicle. For instance, the sensing region may be formed at an entire or partial region of a wind shield glass of the vehicle. Alternatively or additionally, the sensing region may be formed at a driver's seat side window, a passenger seat side window, a left rear seat side window, or a right rear seat side window. Still alternatively or additionally, the sensing region may be formed at a sunroof window of the vehicle.

The driving unit 120 may change various settings of the vehicle, or may drive a specific function. For instance, the driving unit 120 may open or close a driver's seat side window or a passenger seat side window, under control of the controller 110. The driving unit 120 may drive various devices provided inside or outside a specific vehicle, under control of the controller 110. For instance, the driving unit 120 may drive a multimedia device, a navigation device, etc. for playing audio information or video information pre-stored or received from outside, under control of the controller 110. To this end, the driving unit 120 may control a preset music list to be displayed, or may control one included in the preset music list to be automatically played. The driving unit 120 may drive a navigation device so that a path to a destination corresponding to a voice signal or a key input applied from a user can be displayed.

The output unit 150 may be configured to output various types of information, such as audio, video and tactile output. The output unit 150 may include at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the vehicle control apparatus 100 and a user, as well as function as the user input unit 160 which provides an input interface between the vehicle control apparatus 100 and the user.

The display unit 151 may be formed at various parts of the vehicle. For instance, the display unit 151 may be formed at an entire or partial region of a wind shield glass of the vehicle. Alternatively or additionally, the display unit 151 may be formed at a driver's seat side window, a passenger seat side window, a left rear seat side window, or a right rear seat side window. Still alternatively or additionally, the display unit 151 may be formed at a sunroof window of the vehicle.

The memory 140 may be implemented to store data to support various functions or features of the vehicle control apparatus 100. For instance, the memory 140 may be configured to store application programs executed in the vehicle control apparatus 100, data or instructions for operations of the vehicle control apparatus 100, and the like. The memory 140 may store therein various programs for operation of the controller 110, and may temporarily store input or output data. Some of these application programs may be downloaded from an external server via wireless communication. Other application programs may be installed within the vehicle control apparatus 100 at time of manufacturing or shipping, which may be the case for basic functions of the vehicle control apparatus 100 (for example, a starting function, a navigation function, and the like). It is common for application programs to be stored in the memory 140, installed in the vehicle control apparatus 100, and executed by the controller 110 to perform an operation (or function) for the vehicle control apparatus 100.

The memory 140 may store therein information on at least one passenger. The information on at least one passenger may be information on a recognized specific user. For instance, if a voice is input from a user, the controller 110 may recognize the user who has uttered the voice, using a feature of the input voice. If there are a plurality of passengers in the vehicle, the controller 110 may recognize each of the plurality of passengers, based on a result on the recognition. In this instance, information for recognizing each of the passengers may be stored in the memory 140.

The memory 140 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The vehicle control apparatus 100 may also be operated in relation to a network storage device that performs the storage function of the memory 140 over a network, such as the Internet.

The controller 110 may function to control overall operation of the vehicle control apparatus 100, in addition to the operations associated with the application programs. The controller 110 may provide or process information or functions appropriate for a user by processing signals, data, information and the like, which are input or output by the various components depicted above, or activating application programs stored in the memory 140. The controller 110 may drive an application program stored in the memory 140 by controlling at least one of the components shown in FIG. 1. Alternatively or additionally, the controller 110 may drive the application program by combining at least two of the components included in the vehicle control apparatus 100.

The controller 110 may control various types of video information to be displayed on the display unit 151 based on a user's input. For instance, the controller 110 may control at least one of functions executable in the vehicle control apparatus 100, to be executed based on at least one of a user's eyeline direction and a user's voice signal.

The functions executable in the vehicle control apparatus 100 may mean all types of functions executable or drivable in the vehicle control apparatus 100. One of the executable functions may mean an application installed to the vehicle control apparatus 100. 'Executing any function' may mean 'executing or driving an arbitrary application program in the vehicle control apparatus 100'. For instance, the controller 110 may play a music file, or may control a navigation device so that a path to a preset destination can be automatically set, based on at least one of a user's eyeline and a user's voice command.

As another example, the functions executable in the vehicle control apparatus 100 may be functions required to drive the vehicle control apparatus 100. For instance, the function required to drive the vehicle control apparatus 100 may be a function to turn on/off an air conditioner or a hot-air blower provided at the vehicle. Alternatively or additionally, the function required to drive the vehicle control apparatus 100 may be a function to drive wipers installed at a wind shield glass.

At least part of the above components may be operated in a cooperating manner, so that an operation, a control or a control method by the vehicle control apparatus 100 according to various implementations to be explained later can be implemented. The operation, the control or the control method by the vehicle control apparatus 100 may be implemented on the vehicle control apparatus 100 as at least one of application programs stored in the memory 140 is driven.

The controller 110 of the vehicle control apparatus 100 according to some implementations may control various functions executable in the vehicle, based on a user's eyeline and/or a user's voice signal sensed by the sensing unit 130. For instance, the controller 110 may control the driving unit 120, such that at least one of windows provided in the vehicle is open or closed, based on the user's eyeline and/or the user's voice signal. The windows provided in the vehicle may include a driver's seat side window, a passenger seat side window, a left rear seat side window, a right rear seat side window, and a sunroof window.

Figure 2A:
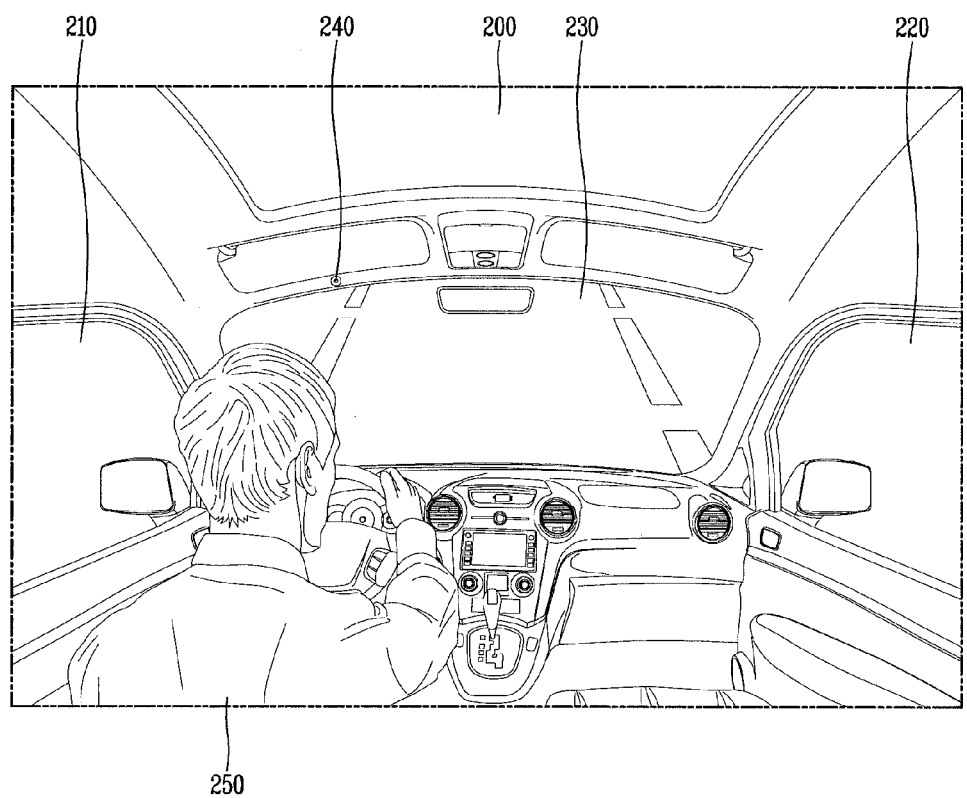
FIGS. 2A to 2C are diagrams that illustrate examples of a vehicle control apparatus opening or closing a window corresponding to a user's eyeline direction.
Figure 2B:
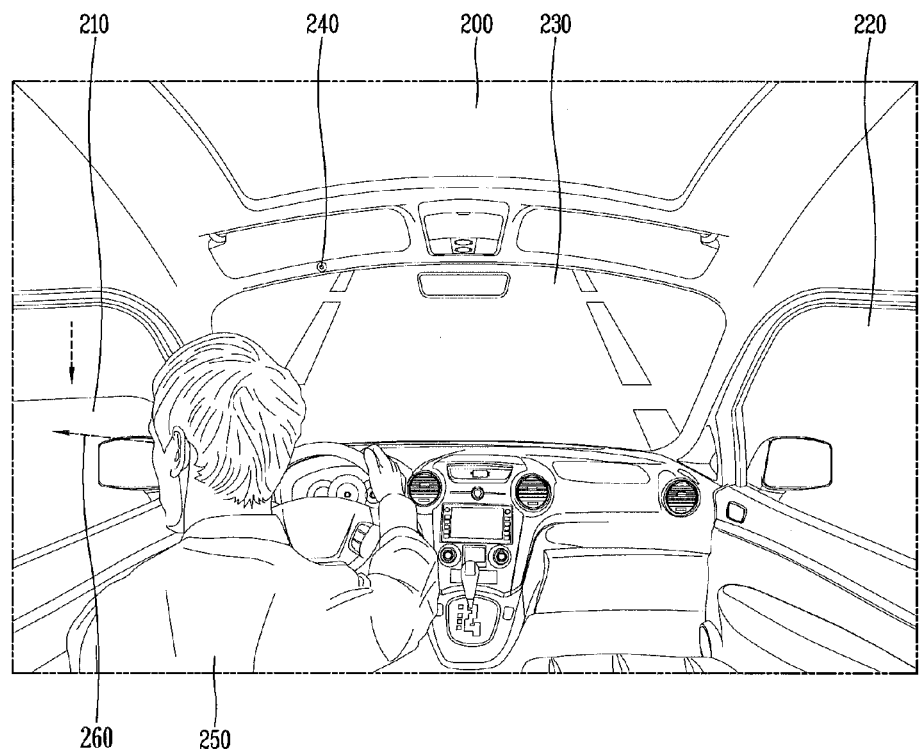
Figure 2C:
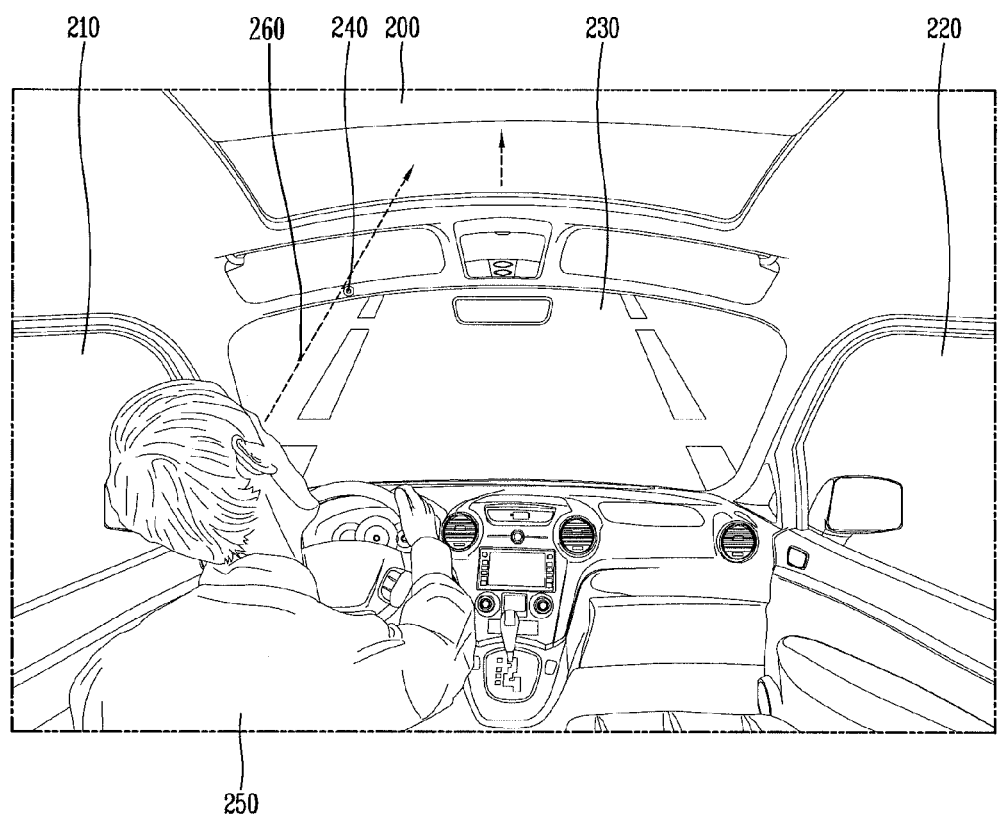

FIGS. 2A to 2C illustrate examples of opening or closing a window corresponding to a user's eyeline direction among a plurality of windows inside the vehicle, in the vehicle control apparatus 100.

FIG. 2A illustrates an example in which a driver 250 is in a vehicle provided with the vehicle control apparatus 100. In some implementations, the controller 110 of the vehicle control apparatus 100 may sense an eyeline direction of the driver 250, based on a sensing result by an eyeline sensor 131. For instance, the eyeline sensor 131 may be a camera 240 provided in the vehicle. The controller 110 may sense the driver's pupils through the camera 240, and may sense the driver's eyeline direction based on a direction of the driver's pupils.

If the driver's eyeline direction is changed, the controller 110 may sense this. For instance, as shown in FIG. 2B, when the driver 250 sees a driver's seat side window 210, the controller 110 may sense movement of the driver's pupils through the camera 240, and thus may sense that the driver's eyeline direction 260 has changed. The controller 110 may determine that the driver 250 is viewing the driver's seat side window 210, based on the driver's changed eyeline direction 260.

In this instance, the controller 110 may open or close a window corresponding to the driver's eyeline direction 260, that is, the driver's seat side window 210. For instance, when the driver 250 stares at the driver's seat side window 210 for more than a predetermined time, the controller 110 may open or close the driver's seat side window 210. Alternatively, if a voice command of the driver 250 is sensed while the driver 250 is staring at the driver's seat side window 210, the controller 110 may control the driver's seat side window 210 to be open or closed based on the voice command. Still alternatively or additionally, if a preset key is input from the driver 250, the controller 110 may control the driver's seat side window 210 to be open or closed based on the input key. FIG. 2B illustrates an example to open the driver's seat side window 210 corresponding to an eyeline direction 260 of the driver 250.

In some implementations, a window corresponding to the driver's eyeline direction 260 is not limited to the driver's seat side window 210. For instance, a window which can be controlled by the driver's eyeline 260 may include all openable windows inside the vehicle. For instance, as shown in FIG. 2B, the driver 250 may select not only a driver's seat side window, but also a passenger seat side window 220 or a sunroof window 200, using only his eyeline 260. Further, although not shown in FIGS. 2A and 2B, the driver 250 may select not only a left rear seat side window, but also a right rear seat side window.

Like in FIG. 2B, the controller 110 may control the sunroof window 200 to be open or closed based on the driver's eyeline and a window control action performed by the driver. For example, as shown in FIG. 2C, when the driver 250 stares at the sunroof window 200, the camera 240 may sense the driver's eyeline direction 260, and may control the sunroof window 200 to be open or closed according to the driver's request. Whether the driver 250 has requested an open or closed state of the sunroof window 200 may be determined according to whether the driver 250 has stared at the sunroof window 200 for more than a predetermined time, or according to whether the driver 250 has performed a preset gesture. For instance, if the driver 250 tilts his head backward or forward while staring at the sunroof window 200 for more than a predetermined time, the controller 110 may control the sunroof window 200 to be open or closed based on such a gesture. If the driver 250 inputs a voice command or a preset key for instruction, the controller 110 may control the sunroof window 200 to be open or closed based on the input voice command or preset key.

The controller 110 may control not only an open or closed state of the window, but also various functions provided in the vehicle, based on the driver's eyeline direction and/or voice. For instance, the controller 110 may control preset information related to the vehicle, to be displayed on at least one of the windows, based on the driver's eyeline direction and/or voice. For instance, the controller 110 may control information corresponding to the driver's voice command (e.g., navigation information) to be displayed on one of the windows corresponding to the driver's eyeline direction.

If it is hard to recognize the driver's eyeline direction or voice command, the controller 110 may use the driver's additional input. For instance, when the number of devices provided in the vehicle and corresponding to the user's eyeline direction is at least two, the controller 110 may control the at least two devices to be displayed in a differentiated manner from other devices. And the controller 110 may control one of the at least two devices to be driven based on input of the driver's voice command or a preset key.

Even when there are a plurality of users, the controller 110 of the vehicle control apparatus 100 according to some implementations may control various functions executable in the vehicle, based on eyeline directions and/or voice signals of the plurality of users.

For instance, a plurality of sensors of the sensing unit 130 may be provided in the vehicle. The sensors may be formed at positions corresponding to a plurality of seats provided in the vehicle. In this instance, if a plurality of passengers are in the vehicle, the sensing unit 130 may sense a voice and an eyeline direction of each of the passengers.

In this instance, the controller 110 may determine a seat in which a passenger who has generated the voice signal is sitting, by receiving sensing signals sensed by sensors corresponding to a seat in which a passenger is sitting, among the plurality of seats. Alternatively or additionally, if the same or similar voice signal is sensed by a plurality of voice sensors 132, the controller 110 may determine a seat in which a passenger who has generated the voice signal is sitting, based on a strength of the voice signal received by each of the voice sensors 132.

Thus, the controller 110 may recognize the plural passengers' voice signals sensed by the sensing unit 130, according to a position of each seat. The controller 110 may recognize eyelines of the passengers who have sat in respective seats, and eyeline directions of the passengers, through the sensing unit 130. The controller 110 may control at least one of the windows of the vehicle to be open or closed, or may control various information related to the vehicle to be displayed, based on the recognized eyeline directions and voice signals of the passengers.

Hereinafter, the aforementioned components will be explained in more detail with reference to FIG. 1, before various implementations implemented by the vehicle control apparatus 100 are explained.

The sensing unit 130 senses information on inside of the vehicle control apparatus 100, information on surroundings of the vehicle control apparatus 100, and information input by a user, and generates a sensing signal corresponding to the information. The controller 110 may control an operation of the vehicle control apparatus 100, may process data related to application programs installed in the vehicle control apparatus 100, or may perform functions, based on the sensing signal. Representative sensors among various sensors of the sensing unit 130 will be explained in more detail.

Firstly, the eyeline sensor 131 is configured to sense a user's eyeline. For instance, the eyeline sensor 131 may recognize a user's pupils, and may sense the user's eyeline direction based on a pupils direction of the user.

To this end, the eyeline sensor 131 may be implemented as at least one sensor. For instance, the eyeline sensor 131 may include a camera sensor (e.g., CCD, CMOS, etc.), a photo sensor (or image sensor), etc. In this instance, the eyeline sensor 131 may recognize a user's pupils and a user's eyeline direction (a pupils direction of the user), based on image information sensed by the camera sensor or the photo sensor. If the user's eyeline direction is changed, the eyeline sensor 131 may sense the changed direction.

Further, the eyeline sensor 131 may sense not only a user's eyeline, but also a user's face direction, etc. In this instance, the controller 110 may further sense a user's face direction based on a sensing result by the eyeline sensor 131, thereby more precisely sensing an eyeline direction of the user. Further, the controller 110 may sense a user's gesture (i.e., a user's gesture to tilt his head backward or forward), based on a sensing result on the user's face direction.

The voice sensor 132 is configured to sense a user's voice. For instance, the voice sensor 132 includes a sensor such as a microphone for receiving audio information, and is configured to sense whether audio information has been received or not and to recognize the received audio information as a voice. To this end, the voice sensor 132 may further include a voice recognition function for recognizing a received sound signal as a voice.

Although not shown, the sensing unit 130 may be further provided with various sensors. For instance, the sensing unit 130 may be further provided with a motion sensor, a proximity sensor, a touch sensor, an ultrasonic sensor, etc.

The motion sensor, a sensor for sensing a user's gesture, may include a camera sensor (CCD, CMOS, etc.), a photo sensor (or image sensors), etc. The motion sensor may recognize a user's gesture based on image information sensed by the camera sensor or the photo sensor, and may apply information on the recognized gesture, to the controller 110.

The proximity sensor may sense presence or absence of an object approaching a surface, or an object located near a surface, by using an electromagnetic field, infrared rays, or the like without a mechanical contact.

The touch sensor may be configured to convert changes of pressure applied to a specific part of a sensing region, or convert capacitance occurring at a specific part of a sensing region, into electric input signals. The touch sensor may also be configured to sense not only a touched position and a touched area, but also touch pressure and/or touch capacitance. A touch object is generally used to apply a touch input to the touch sensor. Examples of touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 110. Accordingly, the controller 110 may sense which region of a sensing region has been touched. Here, the touch controller may be a component separate from the controller 110, the controller 110, and combinations thereof.

In some implementations, the controller 110 may execute the same or different controls according to a type of touch object that touches the touch screen or a touch key provided in addition to the touch screen. Whether to execute the same or different control according to the object which provides a touch input may be decided based on a current operating state of the vehicle control apparatus 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

In some implementations, an ultrasonic sensor may be implemented to recognize position information relating to a touch object using ultrasonic waves. The controller 110, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The display unit 151 may display various video information. For instance, as aforementioned, the display unit 151 may display video information related to various control functions executable in the vehicle control apparatus 100. When a user's authentication is completed, the display unit 151 may display a result on the user's authentication, and information on the currently-authenticated user. The display unit 151 may display (output) information processed in the vehicle control apparatus 100. For instance, screen information displayed on the display unit 151 may be information on an execution screen of an application program driven in the vehicle control apparatus 100, or user interface (UI) and graphic user interface (GUI) information in response to the execution screen information.

Such video information may be displayed on at least part of a wind shield glass of the vehicle. Alternatively or additionally, the video information may be displayed on a driver's seat side window, a passenger's seat side window, etc. The window of the vehicle where the vehicle control apparatus 100 according to some implementations is provided, or at least part of the wind shield glass may be implemented, as a glass display.

The audio output module 152 may output audio data stored in the memory 140. The audio output module 152 can output an audio signal related to a particular function performed by the vehicle control apparatus 100. The audio output module 152 may also be implemented as a receiver, a speaker, a buzzer, or the like.

The output unit 150 of the vehicle control apparatus 100 according to some implementations may include a haptic module 153. The haptic module 153 is configured to generate various tactile effects that a user feels, perceives, or otherwise experiences. An example of a tactile effect that may be generated by the haptic module 153 is a vibration.

The output unit 150 may further include an optical output module 154. The optical output module 154 is configured to output a signal for indicating an event generation using light of a light source. The optical output module 154 may include at least one light emitting diode (LED). Also, the optical output module 154 may display a vehicle-related function or a device inside the vehicle, which has been selected based on a user's eyeline and/or a user's voice, in a distinguishable manner. For instance, the LED may be formed to correspond to each of windows provided in the vehicle. Alternatively or additionally, the LED may be formed to correspond to a multimedia device for playing multimedia data, such as a radio, a sound play-back device, and a moving image player, or a navigation device. In this instance, the controller 110 may display a window, a multimedia device or a navigation device corresponding to a user's eyeline direction and/or a user's voice signal, so as to be distinguishable from other devices, using the LED.

The vehicle control apparatus 100 according to some implementations may further include a user input unit 160. The user input unit 160 is a component that permits input by a user. Once information is input through the user input unit 160, the controller 110 may control various functions executable in the vehicle, in response to the input information. The user input unit 160 may include one or more of a mechanical input element (for example, a key, a button, a dome switch, a jog wheel, a jog switch, and the like), or a touch-sensitive input, among others. As one example, the touch-sensitive input may be a virtual key or a soft key, which is displayed on a touch screen through software processing, or a touch key which is located at a location that is other than the touch screen. On the other hand, the virtual key or the visual key may be displayed on the touch screen in various shapes, for example, graphic, text, icon, video, or a combination thereof.

The user input unit 160 may be formed as a key for inputting at least one direction by a user. If a plurality of windows, functions executable in the vehicle, or a plurality of devices inside the vehicle correspond to a user's eyeline direction, the user input unit 160 may be used so that a single window, a single function or a single device corresponding to the user's eyeline direction can be selected.

Hereinafter, preferred implementations related to a control method which can be implemented by the vehicle control apparatus 100 will be explained in more detail with reference to the attached drawings.

Figure 3:
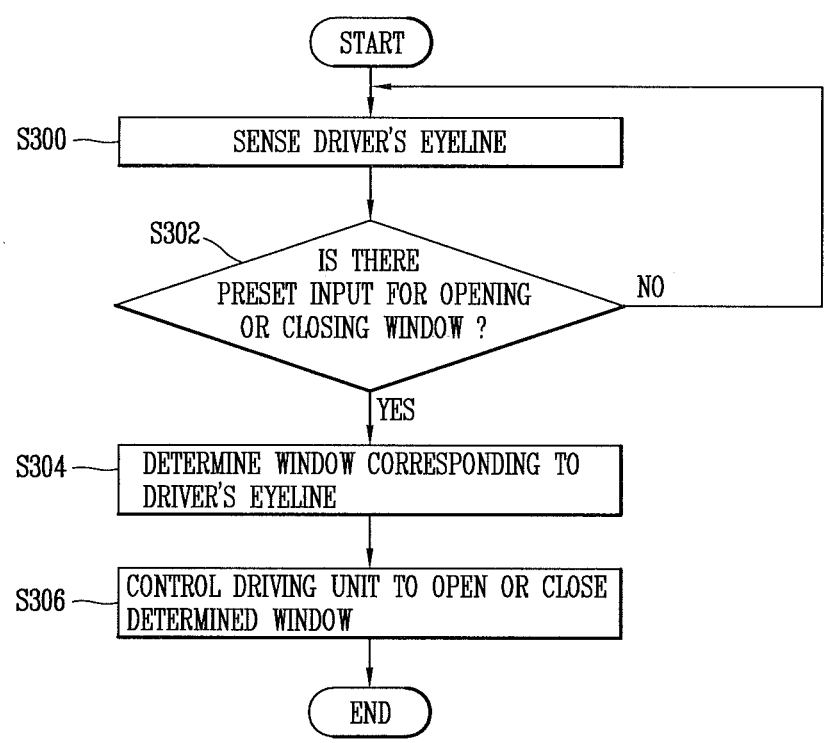
FIG. 3 is a flowchart illustrating an example of a vehicle control apparatus opening or closing a window corresponding to a driver's eyeline direction.

FIG. 3 is a flowchart illustrating an example of opening or closing a window corresponding to a driver's eyeline direction in the vehicle control apparatus.

Referring to FIG. 3, when the vehicle is driven, the controller 110 of the vehicle control apparatus 100 according to some implementations monitors a driver's eyeline direction using the eyeline sensor 131 (S300). It may be determined that the vehicle is in a driven state, if the driver starts the vehicle, if a locked state of the vehicle is released by input of a preset signal, etc.

In this state, the controller 110 may determine whether a preset input for opening or closing a specific window inside the vehicle has been applied (S302). For instance, the controller 110 may determine that there exists a preset input, if a preset key has been input by the driver, or if a voice command for opening or closing a window has been input by the driver. If it is determined that the driver has stared at a preset direction for more than a predetermined time, as a sensing result on the driver's eyeline in S300, the controller 110 may determine that there exists a preset input. Alternatively, if the driver stares at another direction rather than the preset direction for more than a predetermined time, the controller 110 may determine that there exists a preset input. For example, when the driver stares at a front direction, i.e., a wind shield glass 230 for more than a predetermined time, the controller 110 may determine that a preset input does not exist. If the driver stares at a left direction or a right direction, i.e., a driver's seat side window 210 or a passenger seat side window 220 for more than a predetermined time, the controller 110 may determine that there exists a preset input.

If it is determined, in S302, that a preset input for opening or closing a specific window has been applied from the driver, the controller 110 may determine a window corresponding to the driver's eyeline direction (S304). The controller 110 may determine one of windows provided at the vehicle, based on the driver's pupils direction sensed by the eyeline sensor 131. The windows may be the driver's seat side window 210, the passenger seat side window 220, and the sunroof window 200. The window may further include a left rear seat side window and a right rear seat side window. The above configuration is applied to a vehicle having 4 seats. However, implementations are not limited to this.

The vehicle control apparatus 100 of some implementations may be applicable not only to a vehicle having 4 seats, but also to a medium-sized car such as a van where at least 6 passengers can get on, or a large-sized car. In this instance, the driver may select a window to be open or closed, through his eyeline or through a head direction or a voice. More specifically, in case of a window which the driver can see, the driver may select the window through his eyeline. However, in case of a window which the driver cannot see, the driver may select the window through his head direction or voice.

In S304, the controller 110 may not precisely determine a window corresponding to the driver's eyeline direction. For instance, when the driver stares at a left rear seat side window or a right rear seat side window, the controller 110 may not precisely determine whether the driver stares at the driver's seat side window or the left rear seat side window. Likewise, the controller 110 may not precisely determine whether the driver stares at a front passenger seat side window or a right rear seat side window.

In this instance, the controller 110 may determine a single window selected by the user in various manners. For instance, the controller 110 may determine a single window by further considering a face direction of the driver. For instance, in a case where the driver stares at the left rear seat side window, the driver's face direction has more rotated to the left than in a case where the driver stares at the driver's seat side window, even if the driver's pupils direction is similar in the two cases.

When it is hard to determine a window corresponding to the driver's eyeline direction, the controller 110 may control a window corresponding to the driver's current eyeline direction, to be displayed in a differentiated manner from other windows. For instance, the controller 110 may display the window using an optical signal output from a light emitting diode (LED) formed around each window.

As aforementioned, when it is hard to determine whether the driver's eyeline direction is toward the driver's seat side window or the left rear seat side window, the controller 110 may control an LED to be turned on, among LEDs corresponding to the driver's seat side window 210 and the left rear seat side window. The controller 110 may control a single window to be controlled (open or closed) based on the diver's selection. The driver's selection may be input of a preset key, a preset voice, etc. Hereinafter, a method of displaying windows corresponding to a driver's eyeline direction in a differentiated manner from other windows, and a method of selecting a single window based on a driver's input will be explained in more detail with reference to FIG. 4.

If a window corresponding to a driver's eyeline direction is determined in S304, the controller 110 controls the determined window to be open or closed according to a driver's request (S306). The driver's request may be based on input sensed in S302. For example, if the driver stares at a specific window for more than a predetermined time in S032, the controller 110 may open or close the specific window. In this instance, whether to open or close the specific window may be predetermined by the driver. Alternatively or additionally, the controller 110 may control the driving unit 120 such that the specific window is open or closed based on a voice command input in S302, i.e., 'open' or 'close'. Still alternatively or additionally, the controller 110 may control the driving unit 120 such that the specific window is open or closed based on a key input in S302.

FIG. 3 illustrates an example to open or close a window corresponding to a user's eyeline direction when there exists a user's request in S302. However, implementations are not limited to this. As an example, the controller 110 may firstly sense a driver's eyeline direction in S300, unlike in FIG. 3. In this instance, even if a user's request does not exist in S302, a window corresponding to the driver's eyeline direction may be determined. In this state, if there exists a user's request in S302, the controller 110 may control the driving unit 120 to open or close a window corresponding to the driver's eyeline direction.

Figure 4:
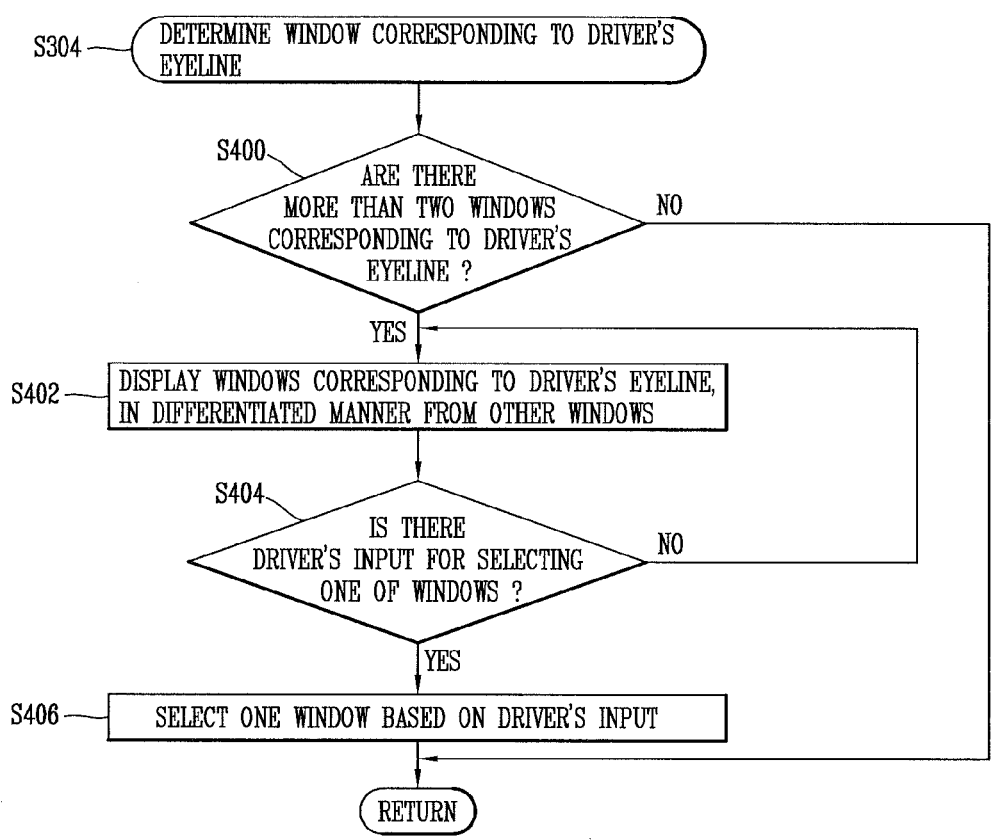
FIG. 4 is a flowchart illustrating an example of a vehicle control apparatus determining a window corresponding to a driver's eyeline direction.

FIG. 4 is a flowchart illustrating an example of determining a window corresponding to a driver's eyeline direction, in the vehicle control apparatus.

Referring to FIG. 4, when it is determined that a preset input for opening or closing a specific window has been applied from the driver in S302, the controller 110 of the vehicle control apparatus 100 according to some implementations may determine whether there are at least two windows corresponding to an eyeline direction of the driver (S400). In this instance, the controller 110 may perform the determination based on the driver's eyeline direction. If there are at least two windows corresponding to the driver's eyeline direction as a determination result, the controller 110 may further consider a face direction of the driver. If it is hard to determine a window corresponding to the driver's eyeline direction, despite further consideration of the driver's face direction, it may be determined that there are at least two windows corresponding to the driver's eyeline direction.

The controller 110 may discern a window corresponding to the driver's eyeline direction, based on an angle of the driver's eyeline direction based on a front side. For instance, when the driver's eyeline direction is within a range of 30°~45° to the left based on the front side, the controller 110 may determine that a window corresponding to the driver's eyeline direction is a driver's seat side window. However, when the driver's eyeline direction is more than 50° to the left based on the front side, the controller 110 may determine that a window corresponding to the driver's eyeline direction is a left rear seat side window. In this instance, if the driver's eyeline direction is within a range of 45°~50° to the left based on the front side, or if the driver's eyeline direction is changed for a predetermined time within a range of 40°~60° to the left based on the front side, the controller 110 may determine that there are two windows corresponding to the driver's eyeline direction (i.e., a driver's seat side window and a left rear seat side window).

If it is determined in S400 that there are at least two windows corresponding to the driver's eyeline direction, the controller 110 may display the windows corresponding to the driver's eyeline direction in a differentiated manner from other windows (S402). For instance, in S402, LEDs formed near windows corresponding to the driver's eyeline direction may be turned on. If the windows can output video information, that is, if the display unit 151 is implemented on an entire part or part of the wind shield glass 230 of the vehicle, the driver's seat side window, the passenger seat side window, the left rear seat side window or the right rear seat side window, the controller 110 may display preset video information on windows corresponding to the driver's eyeline direction in S402.

In this instance, the controller 110 may output a guide message to the wind shield glass 230 of the vehicle, a specific window where the display unit 151 is formed, or a video information output device, in the form of video information or audio information. The guide message may contain content informing that there are more than two windows corresponding to the driver's eyeline direction, the content requesting an additional input for selecting one of the windows by the driver. Further, the guide message may contain information on windows corresponding to the driver's current eyeline direction.

In this instance, the driver may recognize that there are more than two windows corresponding to the driver's current eyeline direction, through LEDs turned on at the periphery of the windows, video information displayed on the windows, or the guide message. The driver may apply an input for selecting one of the windows in a manner requested by the guide message or in a preset manner. The driver's input may be input of a voice command of the driver, a preset key, or a preset gesture of the driver. For instance, the driver may perform a gesture for further rotating his head toward a window desired to be controlled. Alternatively or additionally, the driver may input a voice signal for selecting a specific window. Still alternatively or additionally, the driver may select a specific window by inputting a direction of his desired window, using a specific key formed to input one of a plurality of directions.

The controller 110 may determine whether the driver has applied an input for selecting a specific window (S404). In S404, the controller 110 may determine whether a driver's input for selecting a specific window has been sensed within a preset time. If the driver's input for selecting a specific window has not been applied within a preset time, the controller performs S402 again such that at least two windows corresponding to the driver's eyeline are displayed in another form so as to be distinguishable from other windows. In this instance, the controller 110 may re-output the guide message.

Even if there is a driver's input for selecting a specific window in S404, if a window corresponding to the input is not precisely discerned, the controller 110 may determine that the driver's input for selecting a single window has not been applied. For example, when a specific window corresponding to a driver's input is discernable, the controller 110 may determine in S404 that the driver's input for selecting a single window has been applied.

If a driver's input for selecting a specific window is sensed in S404, the controller 110 may select a single window corresponding to the driver's input (S406). In this instance, the controller 110 may control the driving unit 120 to perform S306 of FIG. 3, such that the selected window is open or closed according to a request of the driver.

As aforementioned, the controller 110 of the vehicle control apparatus 100 according to some implementations may not only control windows to be open or closed, but also control various functions provided in the vehicle based on a user's eyeline and/or voice.

Figure 5:
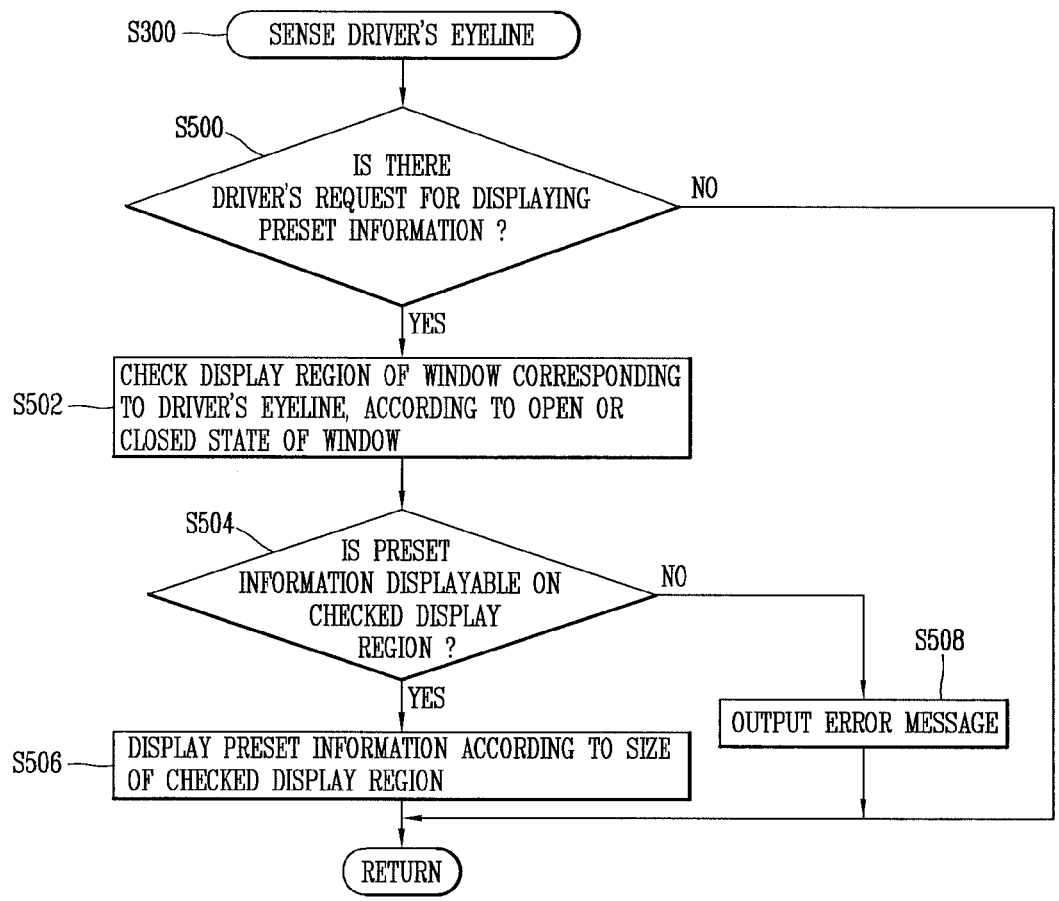
FIG. 5 is a flowchart illustrating an example of a vehicle control apparatus displaying information, according to a driver's request, on a window corresponding to the driver's eyeline direction.

FIG. 5 is a flowchart illustrating an example of displaying information according to a driver's request, on a window corresponding to a driver's eyeline direction, in the vehicle control apparatus 100.

Referring to FIG. 5, when the vehicle is driven, the controller 110 of the vehicle control apparatus 100 according to some implementations monitors a driver's eyeline direction (S300). The controller 110 may sense the driver's eyeline direction. And the controller 110 may determine whether there exists a driver's request for displaying preset information on a window corresponding to the driver's eyeline direction (S500). The window on which preset information is displayed may include not only the driver's seat side window 210, the passenger seat side window 220, the left rear seat side window and the right rear seat side window, but also the wind shield glass 230.

The preset information may be various. For instance, the preset information may be information on a current state of the vehicle, or navigation information such as a currently-set starting point or destination, or a path. Alternatively or additionally, the preset information may be information on various functions executable in the vehicle, e.g., playing multimedia content pre-stored or received, selecting a specific radio channel, or viewing a terrestrial or satellite digital multimedia broadcasting (DMB) (e.g., channel selection, volume control, etc.). Still alternatively or additionally, the preset information may be information on a position change or a height control of a driver's seat, a passenger seat, etc.

The driver's request may be performed in various manners. For instance, the driver's request may be a driver's voice command, or a driver's key input for selecting at least one of preset information on the vehicle. Alternatively or additionally, the driver's request may be a specific gesture of the driver.

If the driver stares at a specific window for more than a predetermined time, the controller 110 may recognize the state as a request from the driver requiring specific information. In this instance, different information may be preset to each window provided in the vehicle. If the driver stares at a specific window for more than a predetermined time, information preset to the specific window may be displayed on the display unit 151 formed on the window.

In case of displaying preset information according to a driver's eyeline, the controller 110 may recognize the driver's eyeline, in a distinguishable manner from a driver's request for opening or closing a window corresponding to the driver's eyeline direction. As an example, in case of displaying preset information according to a driver's eyeline, the controller 110 may control a window corresponding to the driver's eyeline direction to be open or closed, based on input of a specific key, a voice command of the driver, or a gesture of the driver. In this case, the controller 110 may determine whether the driver's eyeline is intended to open or close a specific window, or to display preset information on a specific window, according to whether a preset key (e.g., a preset key for opening or closing a window) has been input or not.

If it is determined in S500 that there is a driver's request for displaying preset information related to the vehicle, the controller 110 may check a display region corresponding to a current open or closed state of a window corresponding to the driver's eyeline direction (S502). For instance, when a window corresponding to the driver's eyeline direction is completely closed, the controller 110 determines that the window has a maximized display region on which preset information can be displayed. However, if the window is open by about 20%, the controller 110 may determine that a display region of the window for displaying preset information corresponds to 80% of the maximized display region. If at least part of the window is inserted into the driver's seat door as the window is open, the controller 110 may determine a size of a display region for displaying preset information, based on an inserted region of the window.

If a size of a display region for displaying preset information is checked based on an open or closed state of the window in S502, the controller 110 may determine whether information requested by the driver can be displayed on the checked display region (S504). For instance, if it is determined that the size of the display region checked in S502 is large enough to display the information requested by the driver, the controller 110 displays the information requested by the driver on the window (S506). In this instance, the controller 110 may enlarge or contract the size of the requested information according to the size of the display region checked in S502. If the window corresponding to the driver's eyeline direction is completely closed, the information requested by the driver may be displayed in a largest size. As the window is open more, the information requested by the driver may be displayed in a smaller size.

If the display region corresponding to an open or closed state of the window corresponding to the driver's eyeline direction has a size less than a predetermined level as a check result in S504, the controller 110 may determine that the requested information cannot be displayed on the window. The reason is because the driver has a difficulty in recognizing the requested information, even if the requested information is displayed after being contracted.

If it is determined in S504 that the display region corresponding to an open or closed state of the window corresponding to the driver's eyeline direction has a size less than a predetermined level, the controller 110 may output an error message informing that the requested information cannot be output (S508). The error message may be output in the form of audio information or video information. Further, the error message may contain content requesting the driver to select another window for displaying the requested information, or content requesting that a currently-selected window (e.g., the window corresponding to the driver's eyeline direction) should be closed.

So far, it has been explained that a specific window is open or closed by a driver of a vehicle provided with the vehicle control apparatus 100 according to some implementations, or preset information related to the vehicle is displayed on the specific window. However, implementations are not limited to this. For example, techniques disclosed in the present application may be also applicable to a case where a plurality of passengers as well as a driver are in the vehicle.

Figure 6:
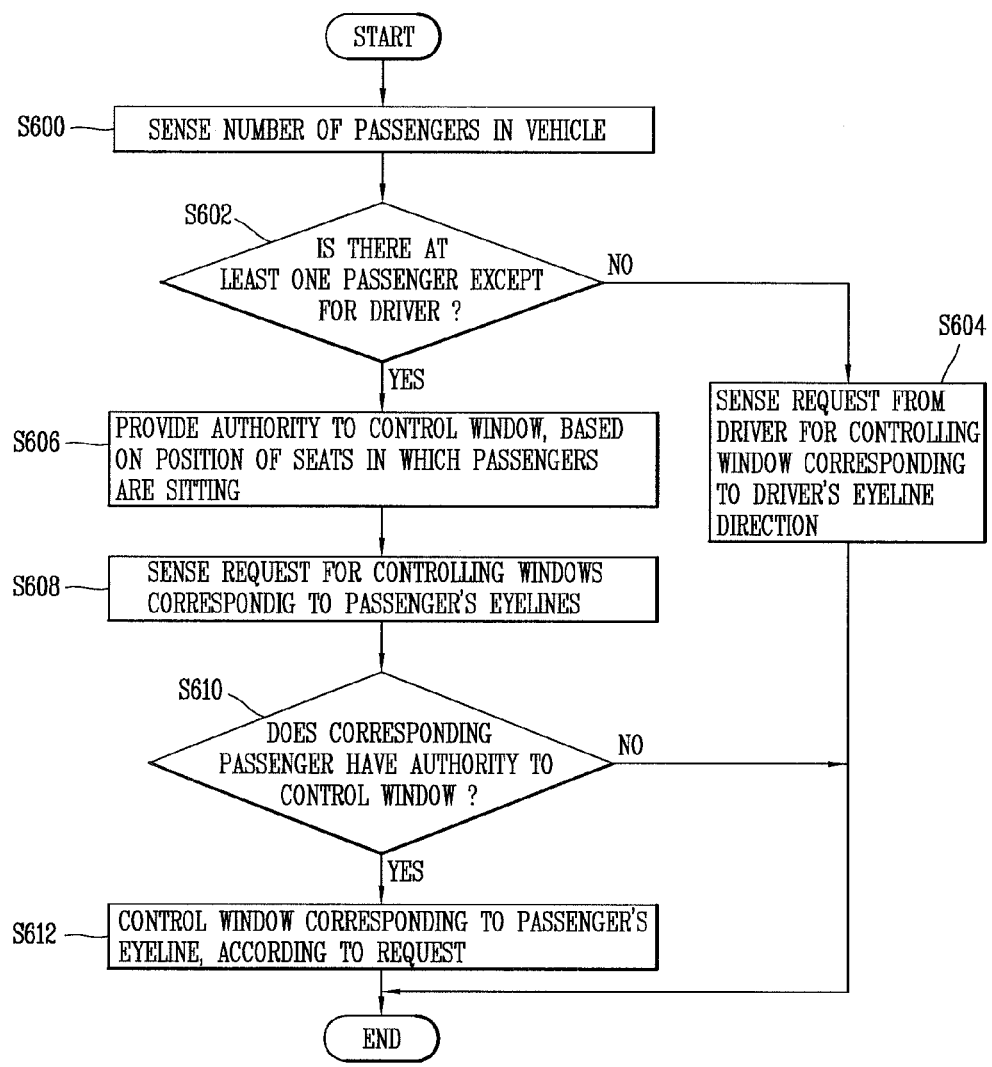
FIG. 6 is a flowchart illustrating an example of a vehicle control apparatus opening or closing a specific window according to a seat position of a passenger, in a case where there is a passenger as well as a driver.
Figure 7:
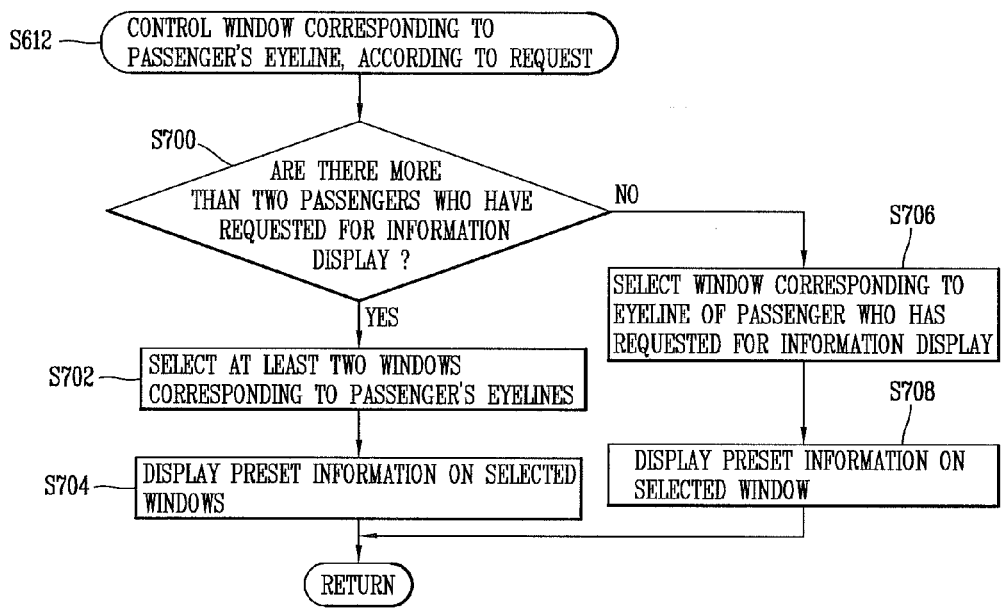
FIG. 7 is a flowchart illustrating an example of a vehicle control apparatus displaying information according to a request from each of a driver and a passenger regarding a window of the vehicle.

FIG. 6 is a flowchart illustrating an example of opening or closing a specific window according to a seat position of a passenger, in a case where there is a passenger as well as a driver, in the vehicle control apparatus.

Referring to FIG. 6, the vehicle control apparatus 100 according to some implementations may sense the number of passengers in the vehicle, when the vehicle is driven (started) or when a locked state of the vehicle is released (S600). For instance, the controller 110 may sense the number of passengers in the vehicle using sensors inside the vehicle. For instance, the eyeline sensor 131 and/or the voice sensor 132 may be provided in plurality, in correspondence to a plurality of seats in the vehicle. The controller 110 may sense the number of passengers sitting in the plurality of seats in the vehicle through the eyeline sensor 131 and/or the voice sensor 132 provided in correspondence to each seat. Alternatively or additionally, the controller 110 may sense the number of passengers sitting in the vehicle, through sensors provided in the respective seats so as to recognize a personal weight, or cameras provided in the vehicle.

If the number of passengers in the vehicle is sensed in S600, the controller 110 may determine whether there are one or more passengers in the vehicle except for the driver (S602). If it is determined in S602 that no passenger except for the driver is in the vehicle, as shown in FIGS. 3 to 5, a window corresponding to the driver's eyeline direction may be open or closed, or preset information may be displayed on a window corresponding to the driver's eyeline direction (S604).

On the other hand, if it is determined in S602 that there are one or more passengers except for the driver, the controller 110 may determine an authority to control a specific window, based on a position of seats in which the passengers including the driver are sitting (S606). For instance, the driver may have an authority to control all windows provided in the vehicle, i.e., the driver's seat side window 210, the passenger seat side window 220, the left rear seat side window, the right rear seat side window, and the sunroof window 200. Further, the driver may have an authority to control the wind shield glass 230 as well as the windows, in case of displaying preset information on a specific window.

However, a passenger rather than the driver may have a restricted authority in controlling the window. For instance, a passenger rather than the driver may have an authority to control only a specific window corresponding to a seat in which himself or herself is sitting. More specifically, a passenger sitting in a passenger seat may have an authority to control only the passenger seat side window 220, and a passenger sitting in a left rear seat may have an authority to control only the left rear seat side window. And a passenger sitting in a right rear seat may have an authority to control only the right rear seat side window.

In this state, the controller 110 may sense whether control of a window corresponding to each passenger's eyeline direction has been requested (S612). In S612, the controller 110 may sense whether a request for controlling a window has been input from each passenger. For instance, the controller 110 may use a sensing result by the eyeline sensor 131 or the voice sensor 132 formed to correspond to each seat. In this instance, the controller 110 may sense each passenger's eyeline based on a sensing result by each eyeline sensor 131, thereby determining a window corresponding to each passenger's eyeline.

Among passengers, there may be a passenger who stares at a specific window for more than a predetermined time, or who applies a voice command for controlling the specific window (e.g., utterance of 'open' or 'close'). In this instance, the controller 110 may determine that control of the specific window corresponding to an eyeline of the passenger has been requested. Further, if a specific key is input by the passenger, the controller 110 may determine that control of the specific window corresponding to the passenger's eyeline has been requested.

If a request for controlling a specific window from at least one of a plurality of passengers is sensed, the controller 110 may determine whether the passenger who has requested the window control has an authority to control the window (S610). If it is determined in S610 that the passenger who has requested the window control has an authority to control the window corresponding to the passenger's eyeline direction, the controller 110 may control the window corresponding to the passenger's eyeline direction to be controlled.

As aforementioned, in a case where a specific window is controllable only by a passenger sitting in a seat corresponding to the specific window, if a passenger stares at a window corresponding to his or her seat for more than a predetermined time, the controller 110 may control the window corresponding to the passenger's eyeline direction. The window corresponding to a seat in which the passenger is sitting may be a side window of the corresponding seat. More specifically, the window may be a passenger seat side window in case of a passenger seat, and the window may be a left rear seat side window in case of a left rear seat. In case of a right rear seat, the window may be a right rear seat side window.

Under such a configuration, even if a passenger sitting in a passenger seat, a left rear seat, or a right rear seat inputs a voice command with staring at the driver's seat side window 210, the driver's seat side window 210 may not be open or closed, or specific information may not be displayed on the driver's seat side window 210.

Unlike a case where each window is controlled only by a passenger sitting in a seat corresponding to said each window, the driver may have an authority to control all windows. In this instance, the controller 110 may control a window corresponding to each seat, based on an eyeline direction and a control request of the driver. If the driver's control request conflicts with a control request by a passenger sitting in a corresponding seat, the controller 110 may control a corresponding window according to one of the driver's control request and the passenger's control request, based on a preset priority.

Even in a case where a plurality of passengers are in the vehicle, the controller 110 of the vehicle control apparatus 100 according to some implementations may control information requested by each of the plurality of passengers to be displayed on a specific window. The specific window may be a window corresponding to each passenger's eyeline.

If it is determined in S610 that at least one passenger who has requested a window control has an authority to control a window corresponding to his or her eyeline direction, the controller 110 may determine whether there are more than two passengers who have requested information display (S700). If it is determined in S700 that there are at least two passengers who have requested the information display, the controller 110 may select at least two windows corresponding to eyeline directions of the passengers who have requested for the information display (S702). In this instance, the selected windows may be windows which can be controlled only by the passengers who have requested for the information display. As an example, the selected windows may be windows corresponding to seats in which the passengers who have requested the information display are sitting. If the passengers who have requested the information display include the driver, the selected windows may include a window corresponding to the driver's eyeline direction.

The controller 110 may display preset information on display regions formed on the windows selected in S702, respectively (S704). In this instance, different information may be displayed on the windows. For example, passengers may request that different information should be displayed on windows which can be controlled only by themselves (e.g., stare at the windows for more than a predetermined time, or input a voice command or a key). As a response to the request, the controller 110 may display different information corresponding to the request on different windows.

If it is determined in S700 that there is a single passenger who has requested the information display, the controller 110 may select a window corresponding to the passenger's eyeline direction (S706). And the controller 110 may display preset information requested by the passenger on the selected window (S708). If the passenger is a driver, the window selected in S706 to display information requested by the driver may be all windows in the vehicle, i.e., a driver's seat side window, a passenger seat side window, a left rear seat side window, a right rear seat side window, and a sunroof window. Also, the window selected in S706 may be the wind shield glass 230.

In case of displaying requested information on one or more selected windows in S704 or S708, the controller 110 may check a size of a display region according to an open or closed state of the one or more selected windows as shown in FIG. 5. In this instance, the controller 110 may determine a display size for the requested information, based on the checked size of the display region. If the checked size of the display region is less than a preset size, the controller 110 may output an error message.

As aforementioned, the controller 110 of the vehicle control apparatus 100 according to some implementations may drive one or more devices inside the vehicle based on a passenger's eyeline direction.

Figure 8:
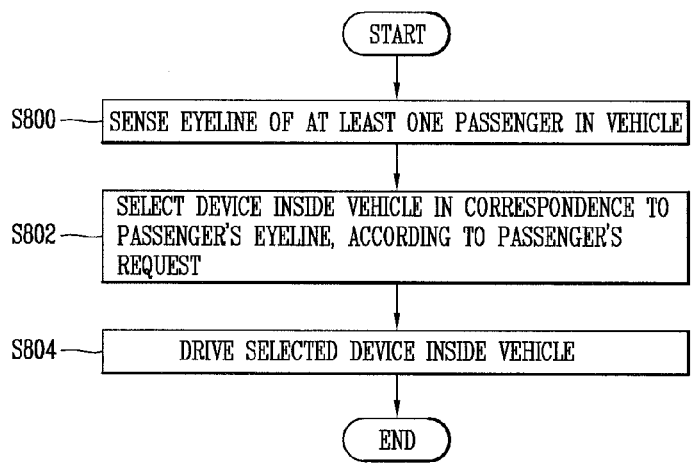
FIG. 8 is a flowchart illustrating an example of a vehicle control apparatus operating devices inside a vehicle based on a passenger's eyeline direction.
Figure 9:
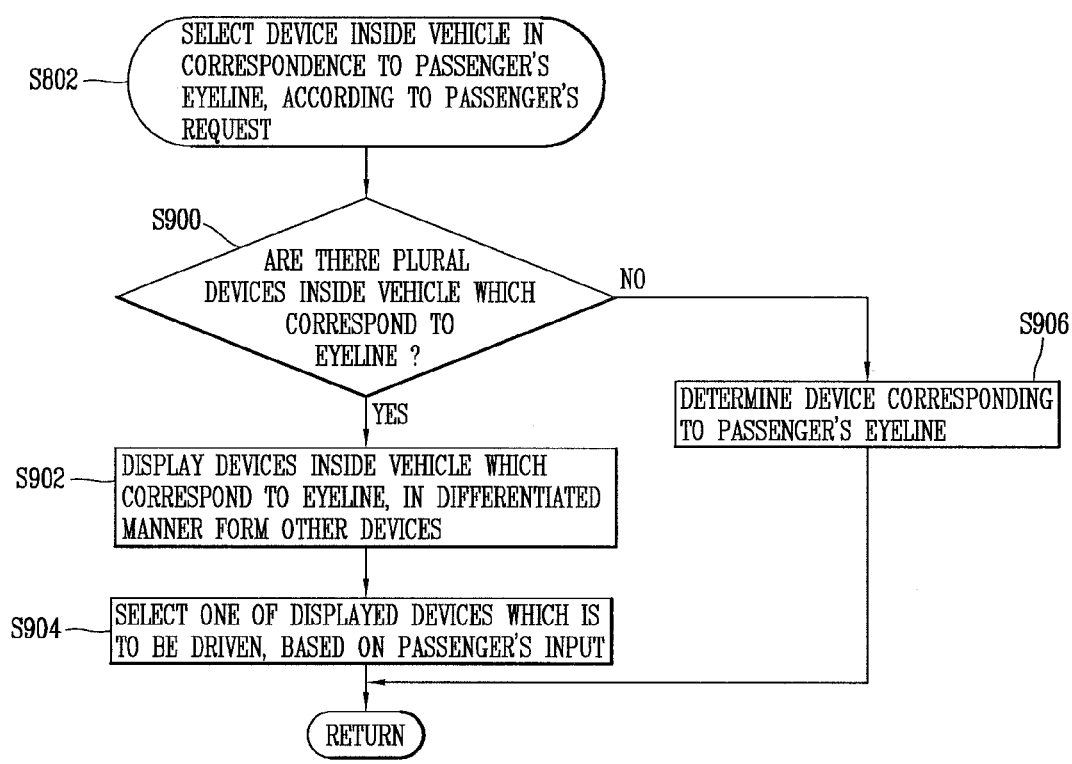
FIG. 9 is a flowchart illustrating an example of further details of a vehicle control apparatus determining a device inside a vehicle, the device corresponding to a passenger's eyeline direction.

FIG. 8 is a flowchart illustrating an example of operating devices inside the vehicle based on a passenger's eyeline direction, by the vehicle control apparatus.

Referring to FIG. 8, when the vehicle is driven, the controller 110 of the vehicle control apparatus 100 according to some implementations senses an eyeline direction of at least one passenger who is in the vehicle (S800). If there is a request from the passenger, the controller 110 may select a device inside the vehicle based on the passenger's eyeline direction (S802).

The passenger's request may be performed in various manners. For instance, if the passenger has input a voice command or a preset key, the controller 110 may determine that there exists the passenger's request. As another example, if the passenger has stared at one of devices inside the vehicle for more than a predetermined time, the controller 110 may determine that the passenger requests for one of the devices which corresponds to the passenger's eyeline direction.

Requesting for one of the devices inside the vehicle may be performed by a passenger having a preset authority. For instance, the controller 110 may control only a pre-authorized passenger to request for driving of one of the devices. In this instance, the pre-authorized passenger may be a pre-designated person such as an owner of the vehicle or a driver of the vehicle.

The controller 110 may provide an authority to request for driving of one of the devices inside the vehicle, based on a seat in which a passenger is sitting. For instance, the controller 110 may provide an authority to request for driving of one of the devices inside the vehicle, only to a driver. In this instance, if the driver has stared at a device inside the vehicle for more than a predetermined time, the controller 110 may determine that the driver requests for driving of the device.

A passenger to which the authority is provided may be variable according to each device inside the vehicle. For instance, in case of a navigation device, an authority to drive the navigation device may be provided only to the driver. However, in case of a radio, a digital multimedia broadcasting (DMB) device, or a multimedia device such as a music player may be provided to both a driver and a passenger sitting in a passenger seat.

If a passenger who has an authority to request for driving selects for a specific device inside the vehicle in S802, the controller 110 may drive the selected specific device inside the vehicle. In this instance, the controller 110 may control the selected specific device inside the vehicle, based on a voice command input or a key input by the passenger who has an authority to request for driving. If the driver stares at the navigation device for more than a predetermined time, the vehicle control apparatus 100 of some implementations may drive the navigation device. Also, the vehicle control apparatus 100 may set a specific place as a destination or a starting point based on the driver's voice command, or may set a path corresponding to the driver's voice command.

In S802, the controller 110 may not precisely discern a device corresponding to the passenger's eyeline direction. For instance, when a single passenger's eyeline direction is toward at least two devices inside the vehicle, or when a plurality of passengers stare at the same device inside the vehicle, the controller 110 may not precisely discern a device corresponding to an eyeline of a specific passenger.

If a plurality of passengers stare at the same device inside the vehicle, the controller 110 drives the device, and may control the device inside the vehicle according to a request input by one of the plurality of passengers (e.g., voice input), based on a priority among request authorities of the plurality of passengers. For instance, when each of a driver and a passenger sitting in a passenger seat has an authority to request for driving of a navigation device, the navigation device may be driven based on the driver's eyeline direction and the passenger's eyeline direction. However, after the driving, the navigation device may be controlled only by the driver's voice command.

The controller 110 may sense whether there are at least two devices corresponding to a passenger's eyeline direction (S900). If there is a single device corresponding to the passenger's eyeline direction, the controller 110 may select the single device (S906). In this instance, the device selected in S906 may be driven in S804 of FIG. 8.

If it is determined in S900 that more than two devices inside the vehicle correspond to the passenger's eyeline direction, the controller 110 may display the devices corresponding to the passenger's eyeline direction in a differentiated manner from other devices (S902). For instance, each of the devices inside the vehicle may be provided with an LED. In this instance, the controller 110 may control LEDs of all devices corresponding to the passenger's eyeline direction to be turned on. In this instance, the passenger may recognize devices inside the vehicle which correspond to his or her eyeline direction, based on optical signals outputted from the LEDs, and may apply an input for selecting one of the devices. The input may be an input of a voice command of the passenger or a preset key, or a preset gesture such as a gesture of the passenger.

If an input for selecting one of the devices is applied in S902, the controller 110 may select a device corresponding to the input, among the devices displayed in a differentiated manner (S904). In this instance, the device selected in S904 may be driven in S804 of FIG. 8.

So far, have been explained processes to open or close a specific window based on a passenger's eyeline direction by the vehicle control apparatus of some implementations, processes to display preset information related to the vehicle on the specific window, and processes to drive devices inside the vehicle based on the passenger's eyeline.

Hereinafter, an operation of the vehicle control apparatus 100 according to some implementations will be explained in more detail with reference to drawings illustrating examples of the processes.

FIGS. 10A to 10D are exemplary views illustrating examples of opening or closing a single window based on a user's eyeline direction, by the vehicle control apparatus.

As aforementioned, the vehicle control apparatus 100 of some implementations may open or close a window corresponding to a driver's eyeline direction, or display preset information related to the vehicle according to the driver's request. Thus, if the driver stares at the driver's seat side window 210 for more than a predetermined time, the controller 110 may open or close the driver's seat side window 210, or may display information on the vehicle on the wind shield glass 230.

If it is difficult to determine whether the driver's eyeline direction corresponds to the wind shield glass 230 or the driver's seat side window 210, the controller 110 may inform the driver of the situation. For instance, as shown in FIG. 10A, the controller 110 may control both a first LED 1000 corresponding to the wind shield glass 230 and a second LED 1002 corresponding to the driver's seat side window 210, to be turned on.

Alternatively or additionally, when it is possible to display video information on the wind shield glass 230 and the driver's seat side window 210, the controller 110 may display preset video information on the wind shield glass 230 and the driver's seat side window 210, thereby informing the driver that there are two windows corresponding to the driver's eyeline direction 260. Further, when there are more than two windows corresponding to the driver's eyeline direction 260, the controller 110 may control a guide message for selecting one of the windows, to be output.

Figure 10A:
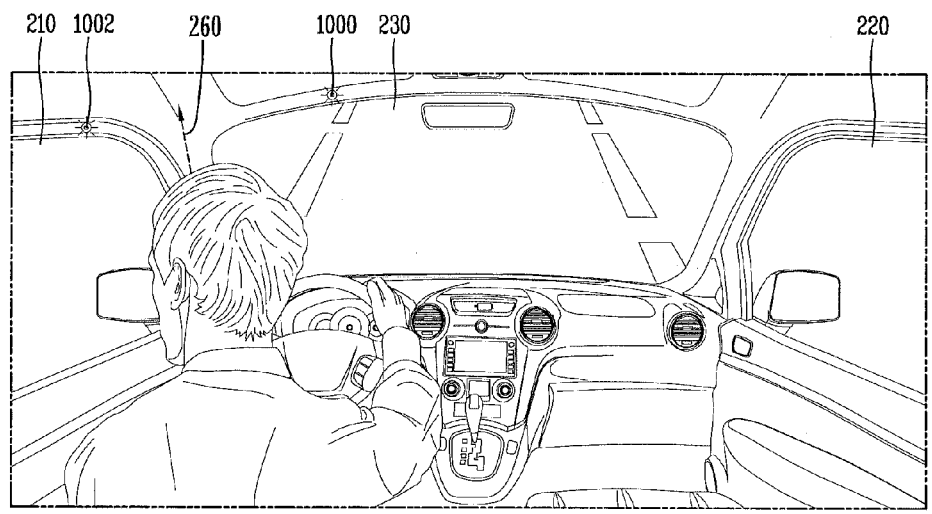
FIGS. 10A to 10D are diagrams illustrating examples of a vehicle control apparatus opening or closing a single window based on a user's eyeline direction.
Figure 10B:
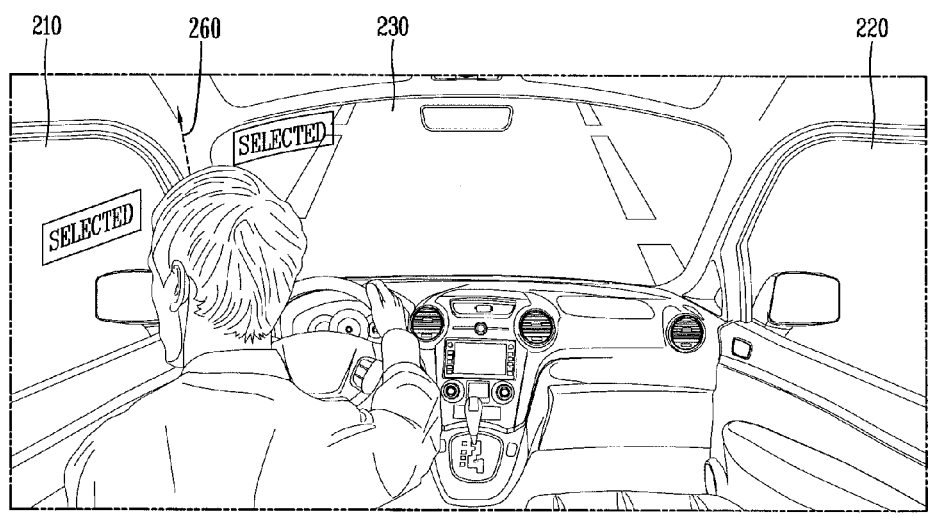
Figure 10C:
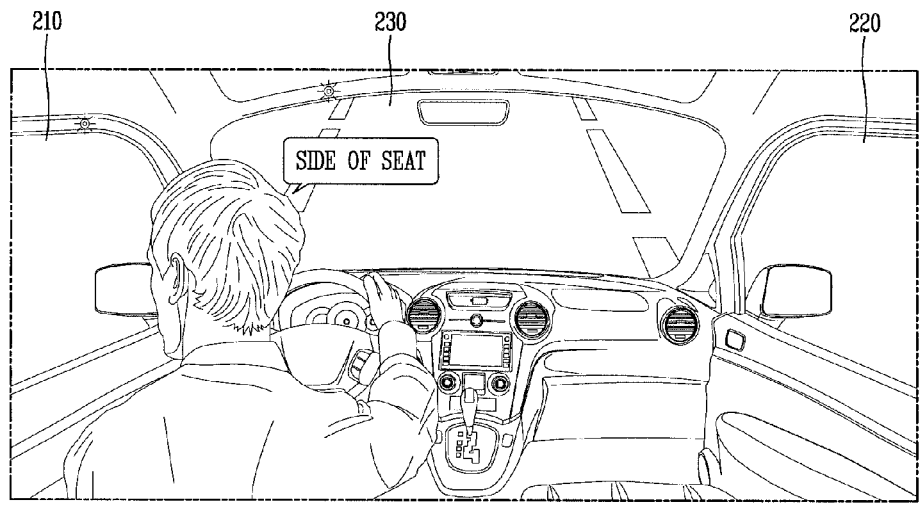

If the driver is informed of a plurality of windows corresponding to his eyeline direction 260, and/or if the guide message is output as shown in FIGS. 10A and 10B, the controller 110 may control the driver to select one of the plurality of windows. For instance, as shown in FIG. 10C, the controller 110 may select one of the plurality of windows, based on a voice command generated from the driver. As shown in FIG. 10C, if the driver applies a voice command for selecting one of the plurality of windows, such as 'side of seat', the controller 110 may select the driver's seat side window 210 as a window corresponding to the driver's eyeline direction 260, based on the driver's voice command.

Figure 10D:
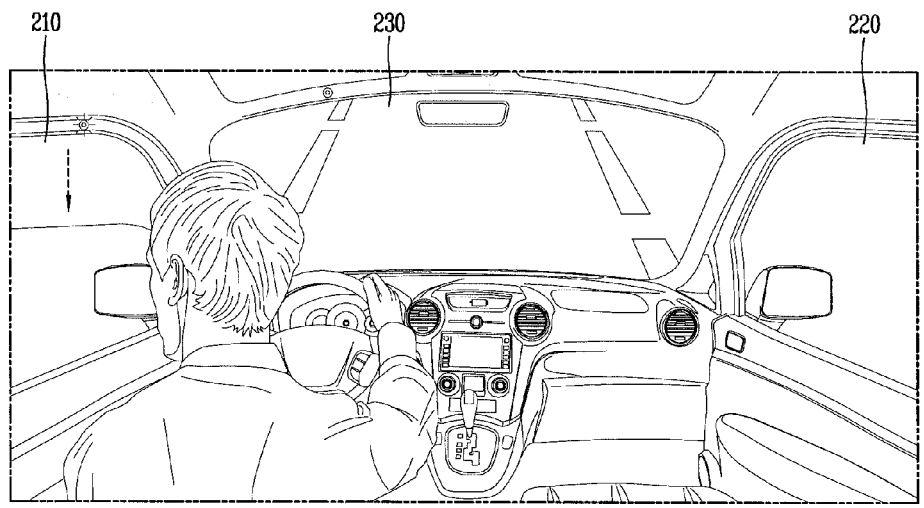

The controller 110 may control the selected window 210 based on a request of the driver. For instance, if it is preset to open a window when the driver stares at the window for more than a predetermined time, the selected window 210 corresponding to the driver's eyeline direction 260 may be open as shown in FIG. 10D.

Unlike in FIG. 100, if the driver selects the wind shield glass 230 through a voice, the controller 110 may control specific information on the vehicle to be displayed according to the driver's request, i.e., in response to the driver's staring at a specific point on the wind shield glass 230 for more than a predetermined time. The specific information may be navigation information, or various information on the vehicle such as a running speed and a running distance of the vehicle.

FIGS. 11A to 11D illustrate examples of displaying information according to a user's request, on a window corresponding to a user's eyeline direction, by the vehicle control apparatus.

Figure 11A:
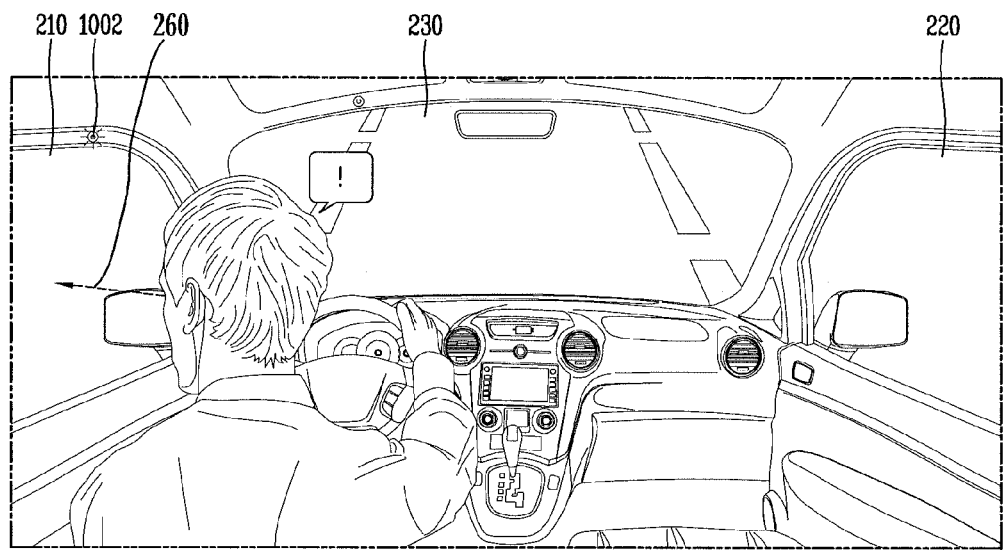
FIGS. 11A to 11D are diagrams illustrating examples of a vehicle control apparatus displaying information, according to a user's request, on a window corresponding to a user's eyeline direction.

For instance, the controller 110 of the vehicle control apparatus 100 according to some implementations may display various information on the vehicle, on a window corresponding to an eyeline direction of the driver, according to a request of the driver. As shown in FIG. 11A, if the driver stares at the driver's seat side window 210 for more than a predetermined time, the controller 110 may display information according to the driver's request, on a window corresponding to the driver's eyeline direction 260, i.e., the driver's seat side window 210. In this instance, the controller 110 may display the selected window, through an LED (e.g., second LED 1002) of the window selected based on the driver's eyeline direction 260, or through video information displayed on the selected window.

Figure 11B:
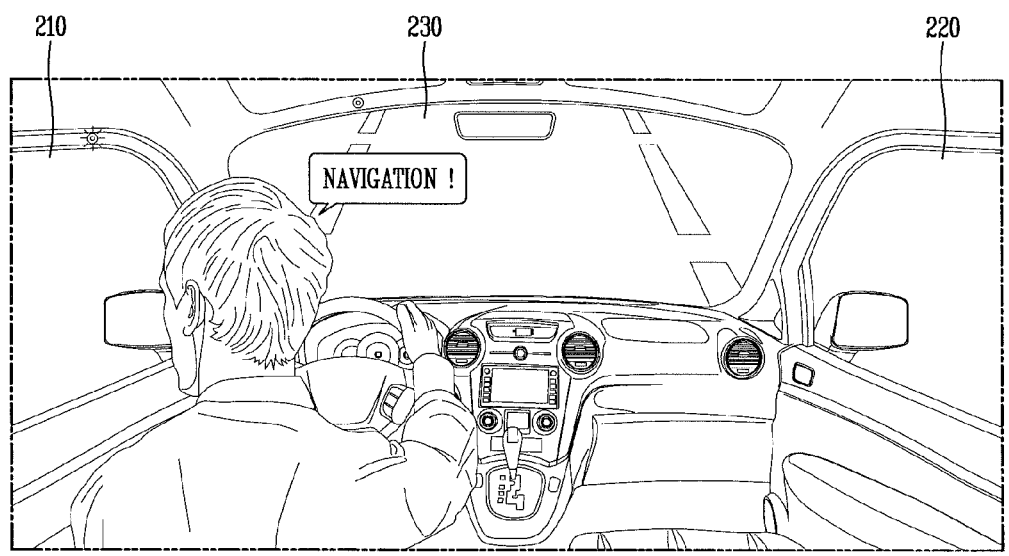

The driver may recognize the window corresponding to his eyeline direction 260, through video information displayed on the LED or the window. In this state, the driver may request for information to be displayed on the selected window, and the request may be input through a voice of the driver. FIG. 11B illustrates such an example.

Referring to FIG. 11B, the driver requests for navigation information through a voice. In this instance, the controller 110 may display the navigation information requested by the driver, on the window selected based on an eyeline direction 260 of the driver, i.e., the driver's seat side window 210.

Figure 11C:
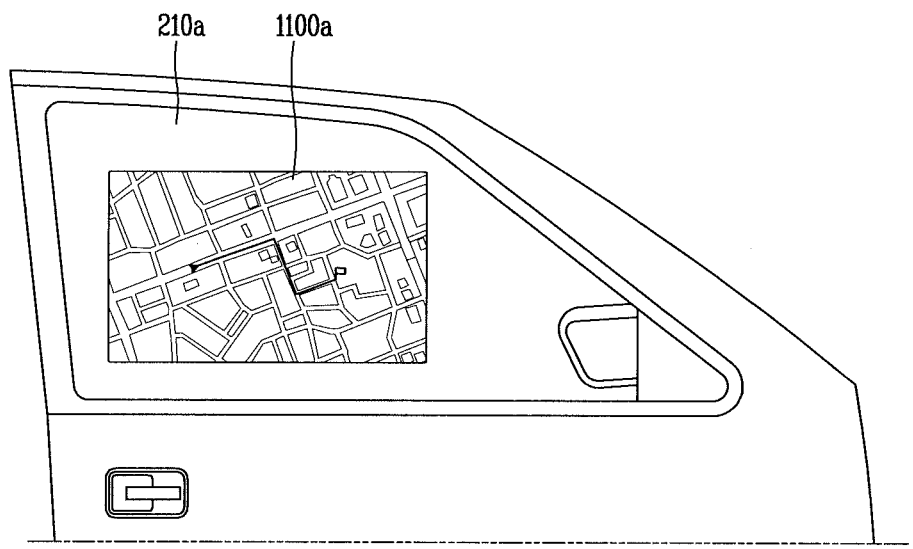

The information displayed on the driver's seat side window 210 may have a different size according to an open or closed state of the driver's seat side window 210. For instance, as shown in FIG. 11C, in case of a driver's seat side window 210*a* in a completely closed state, a display region of the driver's seat side window 210*a* on which navigation information 1100*a* is to be displayed may be maximized. Thus, as shown in FIG. 11C, the navigation information 1100*a* may be displayed in a largest size.

Figure 11D:
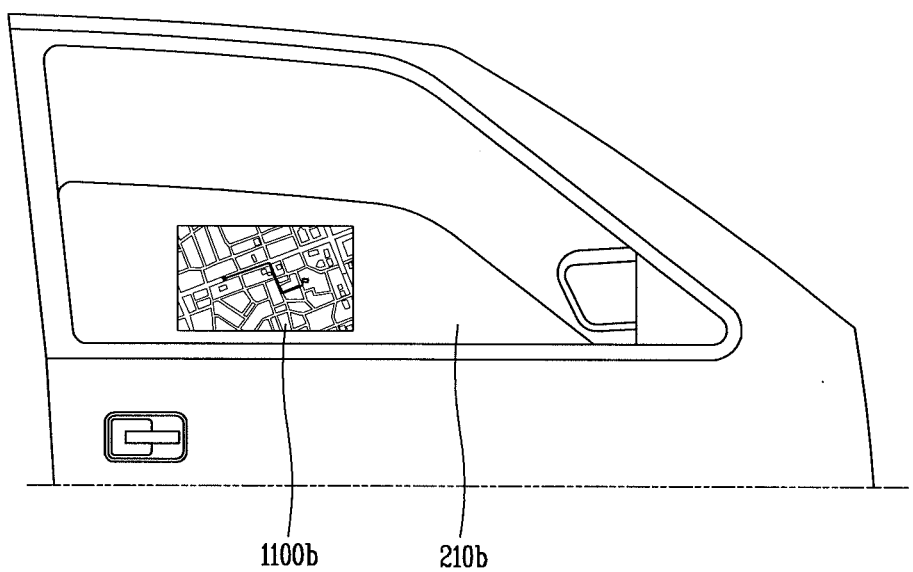

However, as shown in FIG. 11D, in case of a driver's seat side window 210*b* in a half-open state, a display region of the driver's seat side window 210*b* on which navigation information 1100*b* is to be displayed may be determined according to an area of an exposed region of the driver's seat side window 210 to outside of a vehicle door. Thus, as shown in FIG. 11D, the navigation information 1100*b* displayed on the half-open driver's seat side window 210*b* may be displayed in a smaller size than the navigation information 1100*a* displayed on the completely-closed driver's seat side window 210*a*.

If an exposed region of the driver's seat side window 210 to outside of a vehicle door becomes smaller than that shown in FIG. 11D (i.e., if the driver's seat side window 210 is more open), the controller 110 may determine that a size of a display region of the driver's seat side window 210 according to a currently-open state of the driver's seat side window 210 is less than a predetermined level. The controller 110 may display the information on other window, or may output an error message including content requesting the driver to increase an area of an exposed region of the driver's seat side window 210 (i.e., content requesting that the driver's seat side window 210 should be more closed).

Figure 12A:
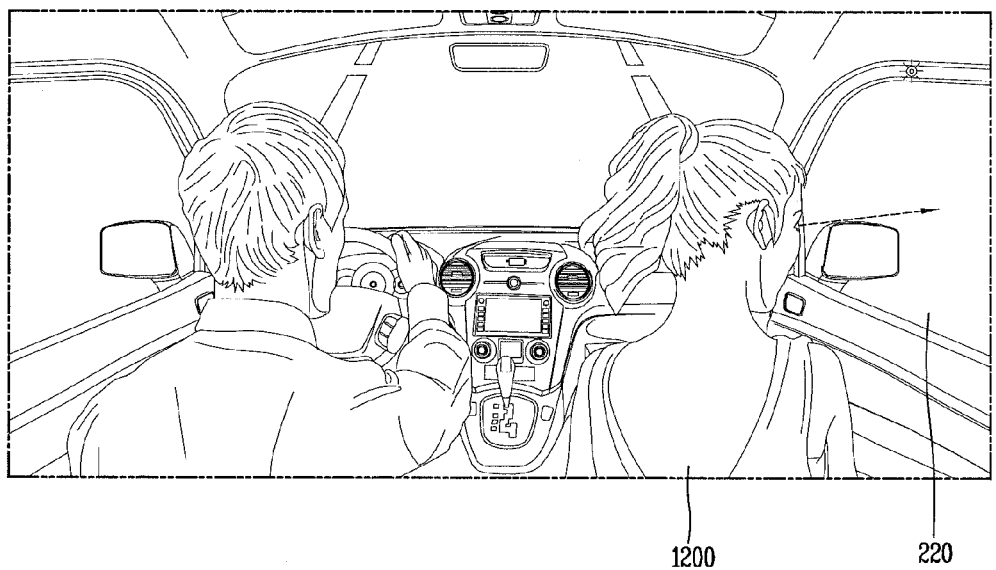
FIGS. 12A and 12B are diagrams illustrating examples of a vehicle control apparatus opening or closing a passenger seat side window, under control of a passenger sitting in a passenger seat.
Figure 12B:
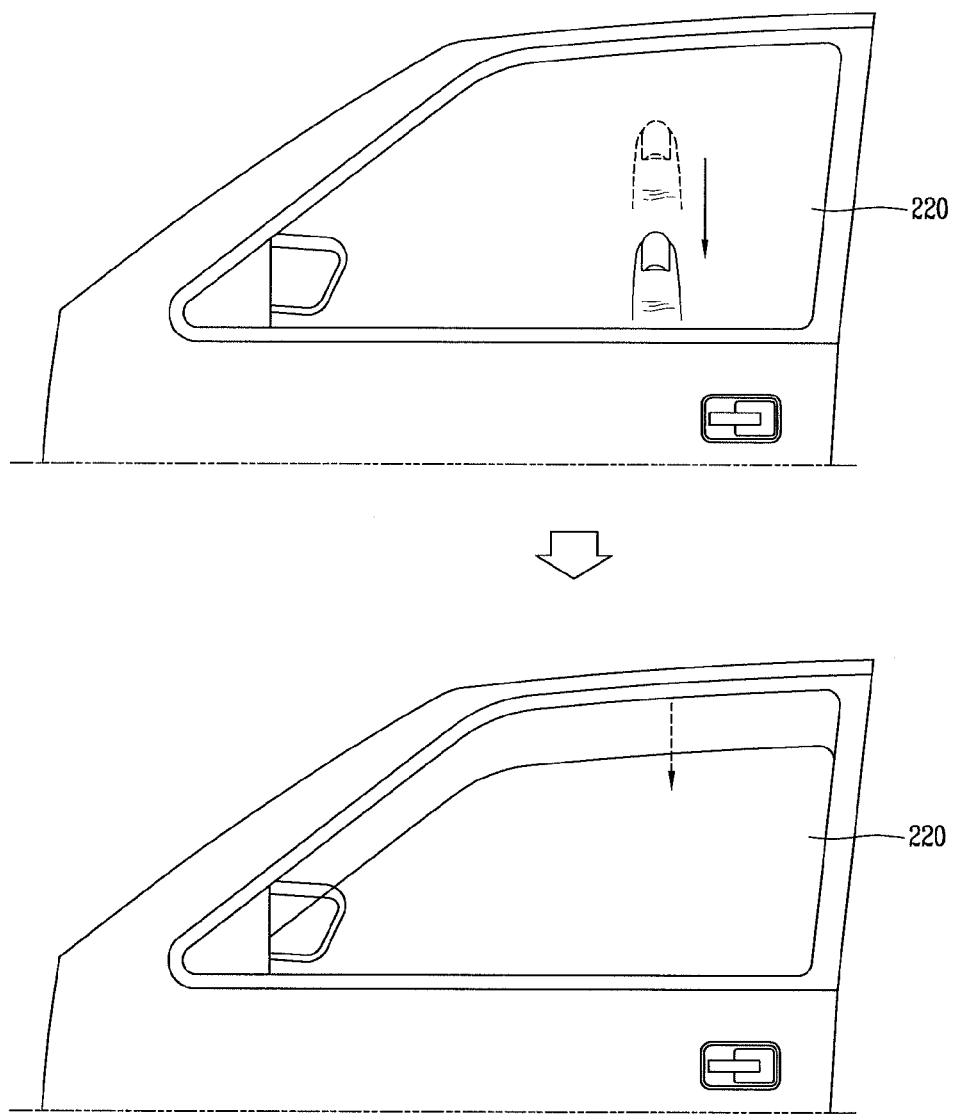

FIGS. 12A and 12B illustrate examples of opening or closing a passenger seat side window, under control of a passenger sitting in a passenger seat, by the vehicle control apparatus.

Referring to FIG. 12A, if a passenger sitting in a passenger seat stares at a specific window, the controller 110 of the vehicle control apparatus according to some implementations may determine that the passenger has requested for control of the specific window. In this instance, the controller 110 may determine whether the passenger has an authority to control the specific window. The authority may be provided based on a position of a seat in which the passenger is sitting.

As shown in FIG. 12A, if a passenger 1200 sitting in a passenger seat stares at the passenger seat side window 220 for more than a predetermined time, the controller 110 may sense that the passenger 1200 who has an authority to control the passenger seat side window 220 has requested for control of the passenger seat side window 220. Then, the controller 110 may control the passenger seat side window 220 according to the passenger's request.

The control of the specific window may include various functions. For instance, the control of the specific window may include a function to display specific information on the specific window, or a function to open or close the specific window. The function may be selected according to a request of a passenger who has a control authority with respect to the specific window. The request may be performed by input of a voice of the passenger, a gesture, a specific key, etc.

Such a gesture may be performed in various manners. For instance, the gesture may be implemented as a gesture of the passenger, or may be implemented based on a touch and drag input applied to the specific window, etc. For example, if a passenger who has a control authority with respect to the specific window applies a touch and drag input of a preset direction to the specific window, the controller 110 may control the specific window to be open or closed based on the touch and drag input.

As shown in FIG. 12B, if the passenger 1200 sitting in a passenger seat applies a touch and drag input in a downward direction, the controller 110 may control the passenger seat side window 220 to be open. The touch and drag input may be recognized by a camera provided in the vehicle, etc., or may be recognized through a sensing region of each window (e.g., the passenger seat side window 220).

Figure 13A:
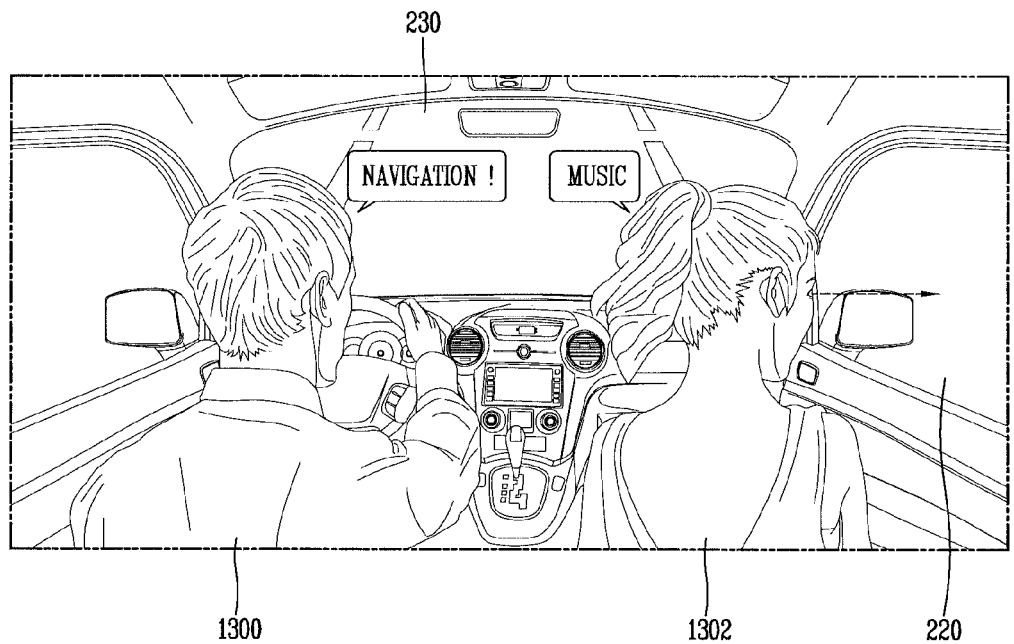
FIGS. 13A to 13C are diagrams illustrating examples of a vehicle control apparatus displaying different information, according to a request from each of a driver and a passenger sitting in a passenger seat, on windows corresponding to eyeline directions of the driver and the passenger.
Figure 13B:
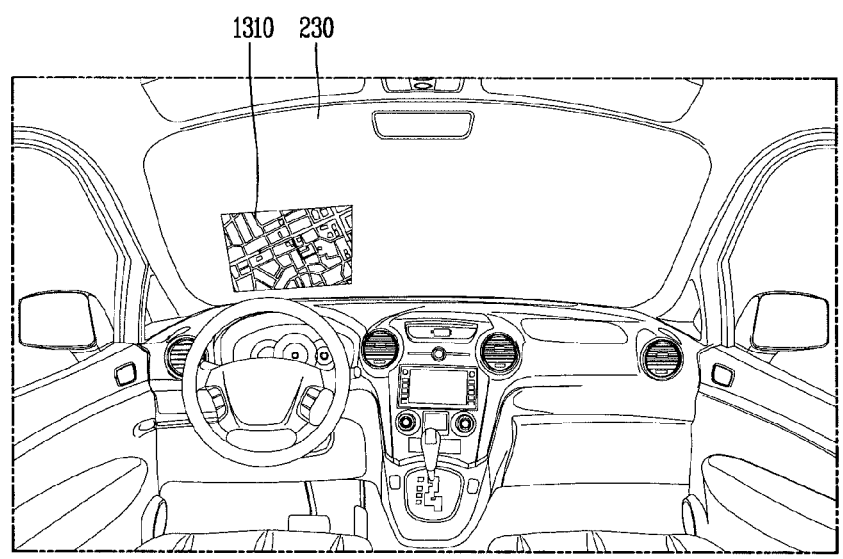
Figure 13C:
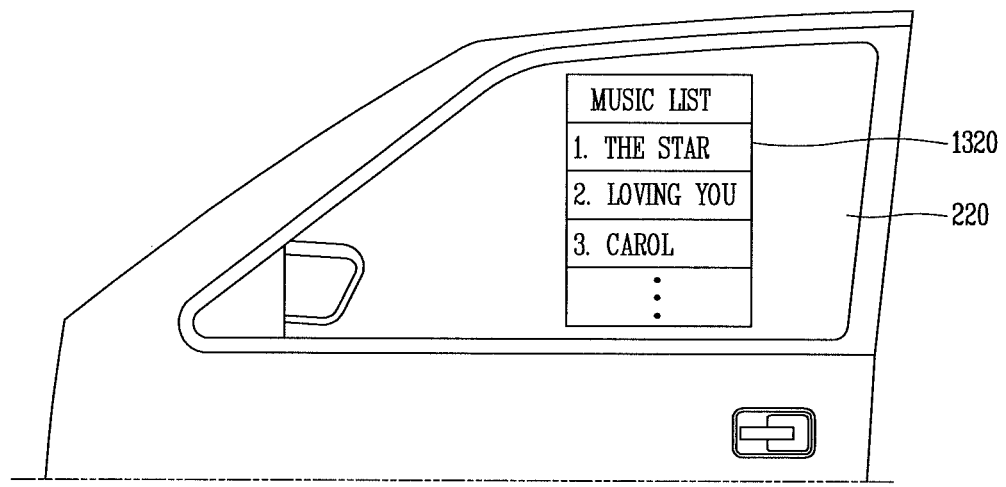

FIGS. 13A to 13C illustrate examples of displaying different information according to a request from a driver and a passenger sitting in a passenger seat, on windows corresponding to eyeline directions of the driver and the passenger, by the vehicle control apparatus.

Referring to FIG. 13A, a driver 1300 and a passenger 1302 stare at different directions, and they request for specific information through their voices. In this instance, the controller 110 may recognize voice commands generated from the driver 1300 and the passenger 1302 separately. For instance, if voice commands generated from the driver 1300 and the passenger 1302 have been recognized in advance, the controller 110 may distinguish the voice command generated from the driver 1300, from the voice command generated from the passenger 1302, based on a result on the voice recognition. Alternatively or additionally, the controller 110 may distinguish the voice command generated from the driver 1300, from the voice command generated from the passenger 1302, based on the eyeline sensor 131 and the voice sensor 132 formed to correspond to the driver's seat and the passenger seat, respectively. And the controller 110 may sense windows corresponding to eyeline directions of the driver 1300 and the passenger 1302.

As shown in FIG. 13A, when the driver 1300 requests for navigation information and the passenger 1302 requests for information on a music list, the controller 110 may display the requested information on windows corresponding to the eyeline directions of the driver 1300 and the passenger 1302. Thus, the navigation information requested by the driver 1300 may be displayed on the wind shield glass 230, and the information on a music list requested by the passenger 1302 may be displayed on the passenger seat side window 220. FIGS. 13A and 13B illustrate such an example.

FIGS. 14A to 14D illustrate examples of operating a single device inside a vehicle according to an eyeline direction and a voice signal of a driver, by the vehicle control apparatus according.

Figure 14A:
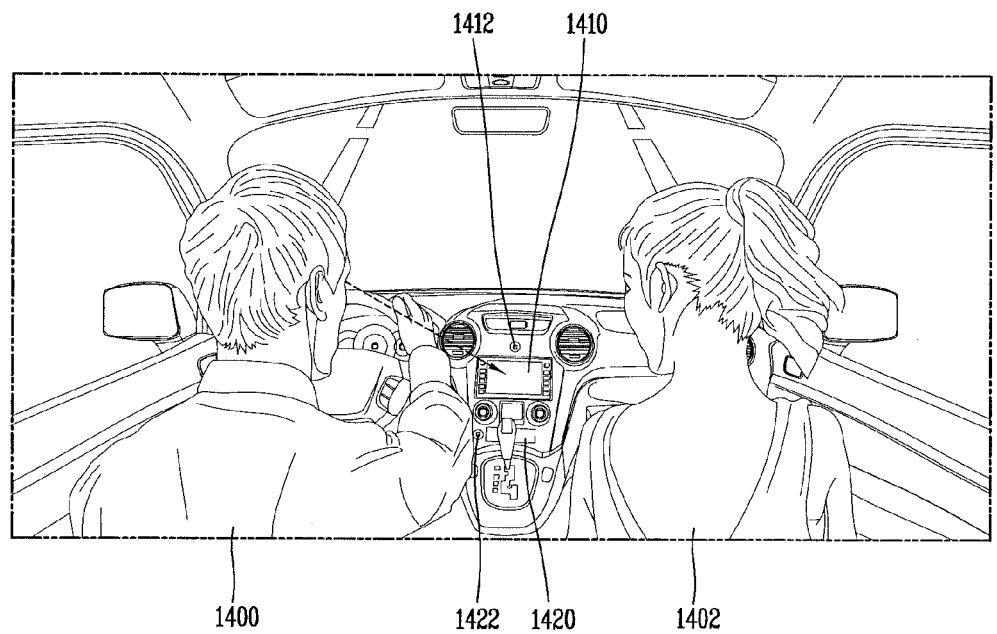
FIGS. 14A to 14D are diagrams illustrating examples of a vehicle control apparatus operating a single device of a vehicle according to a driver's eyeline direction and a driver's voice signal.

Referring to FIG. 14A, the controller 110 of the vehicle control apparatus 100 according to some implementations may select a device inside the vehicle corresponding to an eyeline direction of a driver 1400 or a passenger 1402. In this instance, as aforementioned, an authority to request for driving of a corresponding device is set to a different passenger according to each device inside the vehicle. For instance, in case of a navigation device, the authority to drive the navigation device may be set only to the driver 1400.

Figure 14B:
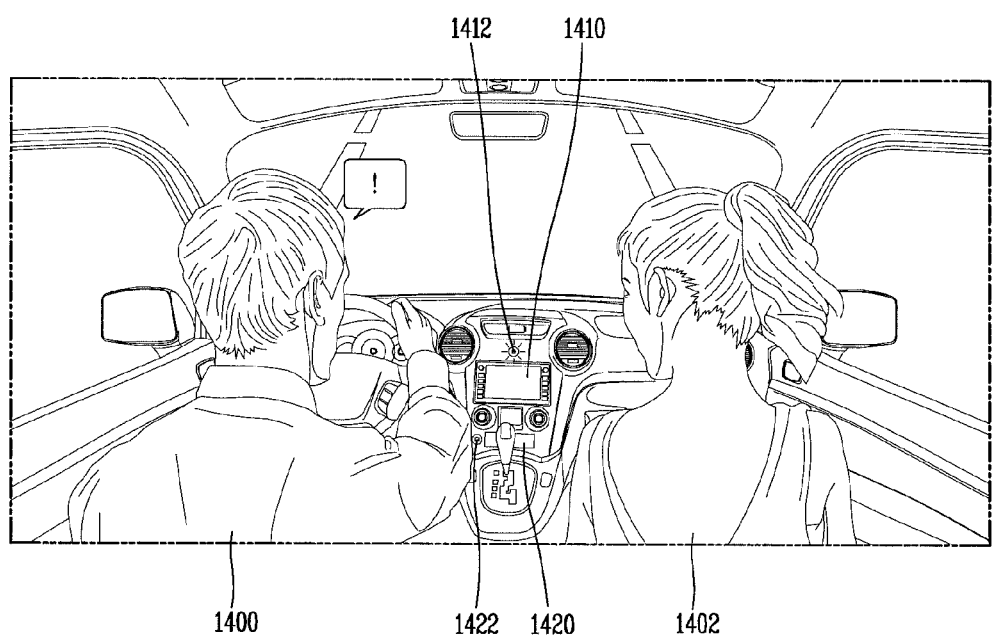

If two eyelines of the driver 1400 and the passenger 1402 who are staring at a navigation device 1410 are sensed, the controller 110 may determine that driving of the navigation device 1410 has been requested, based on the eyeline of the driver 1400. In this instance, as shown in FIG. 14B, the controller 110 may display that the navigation device 1410 corresponding to the driver's eyeline direction is in a driven state, through an optical signal of an LED 1412 corresponding to the navigation device 1410.

Figure 14C:
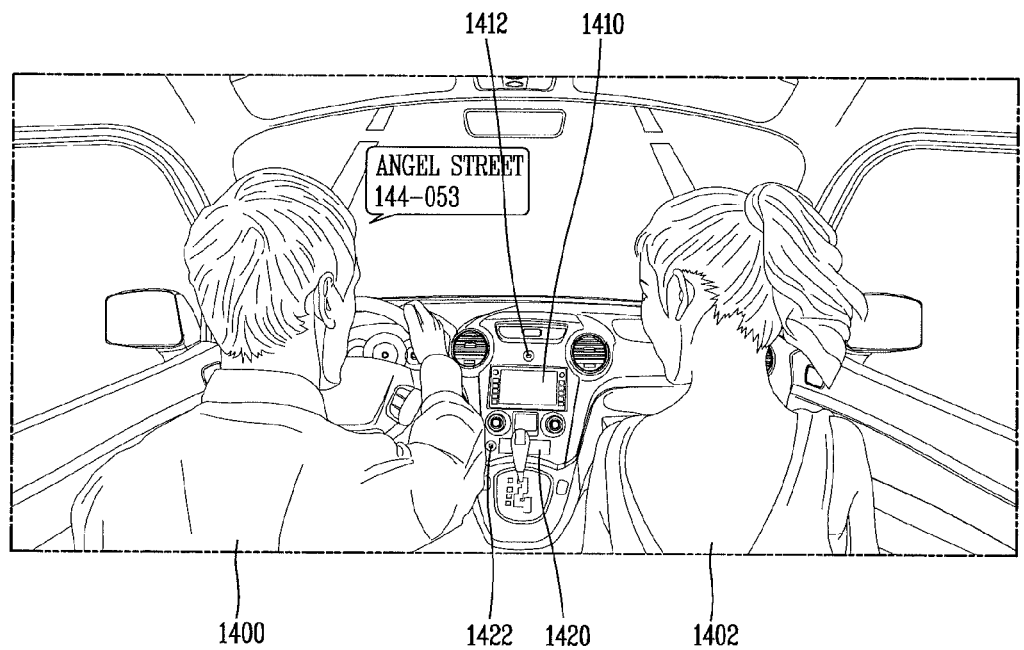

In this instance, the driver 1400 may recognize that the navigation device 1410 is in a driven state through the optical signal of the LED 1412, and may apply an input for manipulating the navigation device 1410. For instance, the input may be applied through a voice as shown in FIG. 14C. The controller 110 may provide an authority to manipulate the navigation device 1410 only to the driver 1400, like a case of providing the authority to request for driving of the navigation device 1410 only to the driver 1400.

Figure 14D:
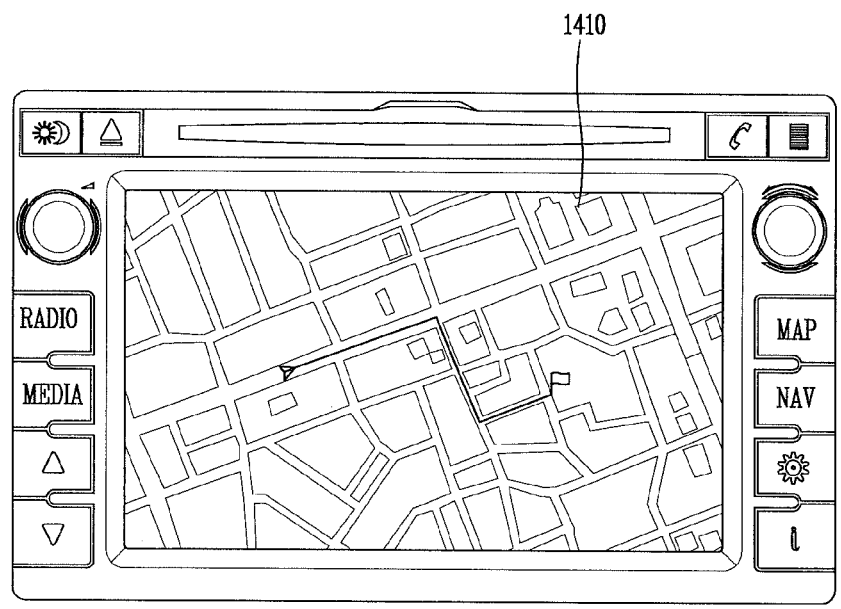

In this instance, the controller 110 may control the navigation device 1410 based on the input applied from the driver 1400. As a result, as shown in FIG. 14D, a destination corresponding to the driver's voice input may be determined, and a path to the destination may be displayed on the navigation device 1410.

Figure 15A:
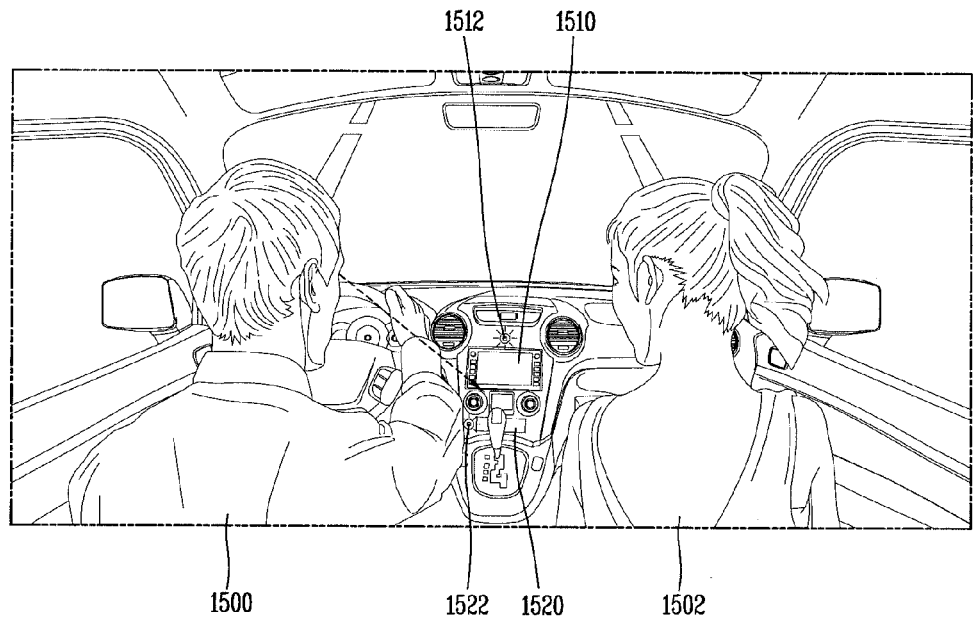
FIGS. 15A and 15B are diagrams illustrating examples of a vehicle control apparatus selecting a single device, in a case where there are a plurality of devices corresponding to a driver's eyeline direction.
Figure 15B:
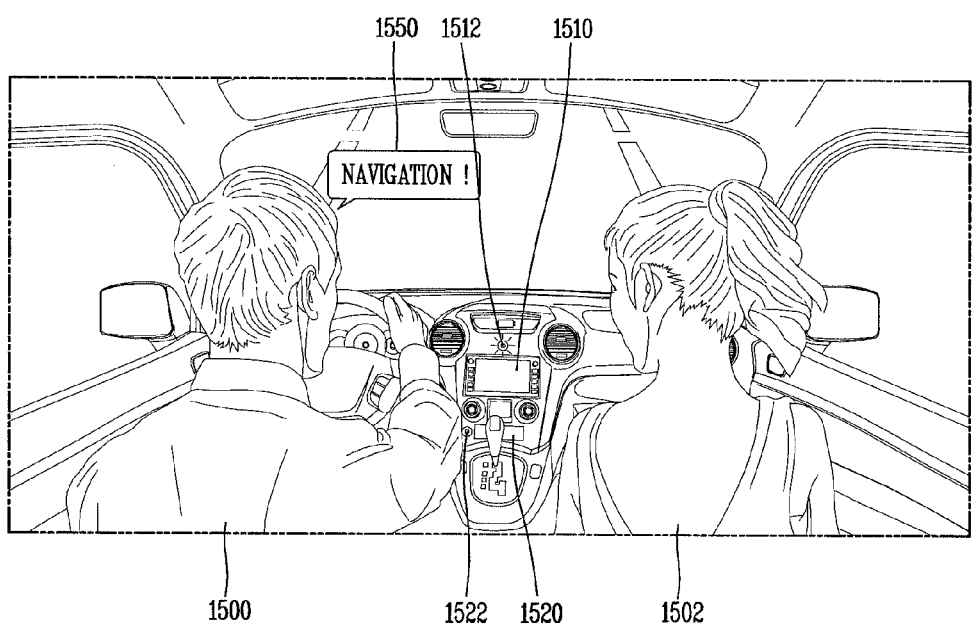

Unlike in FIGS. 14A to 14D, there may be a plurality of devices inside the vehicle which correspond to a driver's eyeline direction. FIGS. 15A and 15B illustrates examples of selecting a single device by the vehicle control apparatus, in a case where there are a plurality of devices corresponding to a driver's eyeline direction.

Referring to FIG. 15A, the controller 110 of the vehicle control apparatus 100 according to some implementations may sense whether driving of a specific device inside the vehicle has been requested, based on a passenger's eyeline. As aforementioned, an authority to request for driving of the specific device inside the vehicle may be differently set.

If an eyeline of a driver 1500 is towards navigation device 1510 and a music player 1520, the controller 110 may determine that a device corresponding to the driver's eyeline are both the navigation device 1510 and the music player 1520. In this instance, the controller 110 may control both an LED 1512 corresponding to the navigation device 1510 and an LED 1522 corresponding to the music player 1520, to be turned on. Alternatively or additionally, the controller 110 may output a guide message in the form of audio information or video information, the guide message requesting an input of the driver 1500 for selecting one of the navigation device 1510 and the music player 1520.

Thus, the driver 1500 can recognize that devices corresponding to his eyeline direction are the navigation device 1510 and the music player 1520, based on the LEDs 1512, 1522 and/or the guide message. The driver 1500 may apply an input for selecting one of the navigation device 1510 and the music player 1520.

For instance, the driver's input may be applied through input of voice information, a preset key, etc. As shown in FIG. 15B, if the driver 1500 designates a specific device (navigation device) through his voice, the controller 110 may select the navigation device 1510 based on input of the driver's voice. In this case, the controller 110 may control only the LED 1512 corresponding to the navigation device 1510 to be turned on, by turning off the LED 1522 corresponding to the music player 1520 which has not been selected, so that the driver 1500 can be informed of the selection of the navigation device 1510. In this instance, as shown in FIGS. 14C and 14D, the navigation device 1510 may be controlled based on the driver's voice input.

In the above descriptions, a specific window is open or closed according to a user's request. However, an open or closed degree of the specific window may be controlled by a passenger. For instance, if a preset key is input to control the specific window, the controller 110 may determine an open or closed degree of the specific window corresponding to an eyeline direction of the passenger, based on an input time of the preset key. If a voice command of the passenger such as 'stop' is applied, the controller 110 may stop an operation to open or close the specific window, such that the passenger adjusts an open or closed degree of the specific window.

In the above descriptions, in an open state of a specific window to some degree, the passenger stares at the specific window. However, techniques disclosed in the present application may be also applicable to a case where the window is completely open, i.e., a case where the specific window is completely inserted into a door to have no exposed region. In some implementations, a specific window is controlled based on a passenger's eyeline direction regardless of whether the specific window is open or not. Thus, even if the specific window is completely open, if the passenger's eyeline is toward the specific window for more than a predetermined time, the controller 110 may determine that control of the specific window has been requested.

If there is a passenger who stares at a specific window for more than a predetermined time, the controller 110 of the vehicle control apparatus 100 according to some implementations may temporarily limit a control authority of the passenger with respect to the specific window. More specifically, if the passenger stares at the specific window for a preset first time, the controller 110 may recognize the state as a control request of the passenger with respect to the specific window. However, if the passenger stares at the specific window for a preset second time without controlling the specific window, the controller 110 may temporarily limit a control authority of the passenger with respect to the specific window. The reason is in order to prevent an accident occurring during driving if the passenger is a driver. If the passenger stares at the wind shield glass for more than the preset second time, specific information is not displayed on the wind shield glass. In addition, the reason is as follows. If a passenger rather than a driver stares at the specific window for more than the preset second time, it may be determined that the passenger merely sees outside of the specific window. The preset second time may be longer than the preset first time.

The controller 110 of the vehicle control apparatus 100 according to some implementations may limit a control authority with respect to a window, according to external surroundings. For instance, in a case where the vehicle is driven in a bad weather condition such as rain or snow, an open state of a window may be restricted as a passenger stares at the window for more than a predetermined time. In this instance, if the passenger wishes to open the window, other additional input (e.g., voice input) may be required.

The controller 110 of the vehicle control apparatus 100 according to some implementations may limit the control authority with respect to a window, based on a vehicle speed. The reason is as follows. In a case where a vehicle speed is more than a preset level, if a driver stares at another direction so as to control a window, an accident may occur. Thus, when the vehicle speed is more than the preset level, the controller 110 of the vehicle control apparatus 100 according to some implementations may restrict a function to control a device inside the vehicle or a specific window, based on an eyeline direction of the driver.

The vehicle control apparatus and the control method of the present disclosure may, in some implementations, have the following advantages.

Firstly, according to some implementations, enabling at least one window inside a vehicle to be controlled based on a user's eyeline direction may reduce the need for a large number of keys or buttons provided in the vehicle.

Secondly, according to some implementations, enabling at least one device provided in the vehicle to be operated based on a user's eyeline direction may allow a user to perform functions executable in the vehicle more easily and conveniently.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A vehicle control apparatus, comprising:
   a sensing unit configured to sense eyelines of passengers including a driver in a vehicle; and
   a controller configured to:
      identify at least one window of the vehicle that corresponds to the sensed eyelines of the passengers;
      detect at least one window control action performed by the passengers; and
      control the identified at least one window to open or close based on the at least one window control action performed by the passengers,
   wherein the controller is further configured to:
      grant each of the passengers a respective window control authority having a priority based on a respective seat in which each of the passengers is seated; and
      based on a determination that the at least one window control action performed by the passengers comprises a plurality of window control actions performed by a plurality of passengers that are all directed to controlling one window among the at least one window of the vehicle:
         control the one window according to a control action performed by one of the passengers based on the priorities of the window control authorities of the passengers seated in different seats.

2. The vehicle control apparatus of claim 1, wherein the window control action performed by the one of the passengers relates to at least one of a time duration for which the one of the passengers has stared at the one window that corresponds to the eyeline of the one of the passengers, a preset key input applied from the one of the passengers, or a voice command input applied from the any one of the passengers, and
   wherein the one of the passengers is authorized to control the one window by the granted window control authority.

3. The vehicle control apparatus of claim 1, wherein the controller is further configured to:
   determine, among the passengers and based on the seats on which the passengers are seated, at least one of a driver or a passenger other than the driver; and
   grant the driver a first window control authority having a higher priority than a second window control authority granted to the passenger other than the driver.

4. The vehicle control apparatus of claim 2, wherein the controller is further configured to control the one window that corresponds to the eyeline of the one of the passengers to be open or closed based on determining that the one of the passengers has stared at the one window that corresponds to the eyeline of the one of the passengers for more than a preset first amount of time.

5. The vehicle control apparatus of claim 4, wherein the controller is further configured to, based on determining that a time duration for which the one of the passengers has stared at the one window that corresponds to the eyeline of the one of the passengers exceeds a preset second amount of time:

output an alert message through an audio output unit or a display unit provided in the vehicle, or restrict the one of the passengers from controlling the one window that corresponds to the eyeline for a predetermined time.

6. The vehicle control apparatus of claim 2, wherein the controller is further configured to control the one window that corresponds to the eyeline of the one of the passengers to be open or closed based on a touch and drag input applied from the one of the passengers onto the one window that corresponds to the eyeline of the one of the passengers.

7. The vehicle control apparatus of claim 1, wherein the controller is further configured to control the one window that corresponds to the sensed eyeline of the one of the passengers to be displayed so that the one window is distinguishable by the one of the passengers from other windows among the at least one window of the vehicle.

8. The vehicle control apparatus of claim 7, wherein the controller is further configured to display the one window that corresponds to the sensed eyeline of the one of the passengers using video information displayed on a preset region of each of the at least one window, or using an optical signal of a light emitting diode (LED) corresponding to each of the at least one window.

9. The vehicle control apparatus of claim 1, wherein the at least one window of the vehicle comprises at least one of a sunroof window, a driver's seat side window, a passenger seat side window, a left rear seat side window, or a right rear seat side window.

10. The vehicle control apparatus of claim 1, wherein the controller is further configured to, based on determining that at least two different windows of the at least one window of the vehicle correspond to the sensed eyeline of the one of the passengers, further determine a particular window to be opened or closed based on a key input or a voice command input applied from the one of the passengers.

11. The vehicle control apparatus of claim 10, wherein the controller is further configured to output audio information or video information prompting the one of the passengers to input a key input or a voice command input indicating a selection of one of the at least two different windows to be opened or closed.

12. The vehicle control apparatus of claim 10, wherein the controller is further configured to, based on determining that the at least two different windows correspond to the sensed eyeline of the one of the passengers, further determine the particular window to be opened or closed based on a direction in which the passenger is facing.

13. The vehicle control apparatus of claim 1, wherein at least one of the at least one window of the vehicle is configured to display video information, and wherein the controller is further configured to display, on the one window that corresponds to the eyeline of the one of the passengers, preset information related to the vehicle according to the window control action of the one of the passengers.

14. The vehicle control apparatus of claim 13, wherein the window control action of the one of the passengers comprises a voice command input requesting preset information related to the vehicle, or an input using at least one key corresponding to the preset information.

15. The vehicle control apparatus of claim 13, wherein the controller is further configured to determine a size of a display region of the identified one window where the preset information is to be displayed based on an open or closed state of the one window that corresponds to the eyeline of the one of the passengers.

16. The vehicle control apparatus of claim 13, wherein the controller is further configured to:
 detect eyelines of the passengers;
 identify at least two windows that correspond to the detected eyelines of the passengers;
 detect window control actions from the passengers; and
 display respective information related to the vehicle on each of the at least two windows based on the window control actions from the passengers,
 wherein the respective information displayed on each of the at least two windows is different information related to the vehicle.

17. The vehicle control apparatus of claim 3, wherein the controller is further configured to, based on determining that an operating speed of the vehicle is less than a threshold speed, control at least one of the at least one window to be opened or closed based on determining an eyeline of the driver of the vehicle.

18. A vehicle control apparatus comprising:
 a sensing unit configured to sense eyelines of passengers comprising a driver in the vehicle; and
 a controller configured to:
  identify at least one device of the vehicle that corresponds to the sensed eyelines of the passengers; and
  operate the identified at least one device of the vehicle based on the sensed eyelines of the passengers,
 wherein the controller further configured to:
  grant each of the passengers a control authority having a respective priority based on respective seats in which the passengers are seated; and,
  based on a determination that the eyelines of the passengers comprise a plurality of eyelines of a plurality of passengers that are all directed to one device among the at least one device of the vehicle:
   operate the one device according to an eyeline of one of the plurality of passengers based on the priorities of the control authorities of the passengers seated in different seats,
 wherein the at least one device of the vehicle comprises at least one multimedia device and at least one navigation device of the vehicle, and the one device that is operated by the controller is a multimedia device or a navigation device of the vehicle.

19. The vehicle control apparatus of claim 18, wherein the controller is further configured to, based on determining that among the at least one device, there are two or more different devices that correspond to the eyeline of the one of the passengers, control a particular device among the two or more different devices that correspond to the eyeline of the one of the passengers to have an appearance that differentiates the particular device from other devices among the two or more different devices, and
 wherein the controller is further configured to control an operation of at least one of the two or more different devices that has been selected by the one of the passengers among the at least one device.

20. A method of controlling a vehicle including a plurality of windows, the method comprising:
 granting each of passengers including a driver in a vehicle a window control authority having respective priorities based on respective seats on which the passengers are seated;
 sensing eyelines of the passengers;
 identifying, among the plurality of windows of the vehicle, at least one window that corresponds to the sensed eyelines of the passengers;

detecting window control actions performed by the passengers for controlling at least one of the plurality of windows; and controlling the at least one window that corresponds to the eyelines of the passengers according to the detected window control actions, wherein controlling the at least one window comprises:
  based on a determination that a plurality of control actions detected from the passengers are all directed to controlling one window among the plurality of windows of the vehicle:
    opening or closing the one window or displaying preset information related to the vehicle on the one window, according to the control action detected by one of the passengers based on the priorities of the window control authorities of the passengers seated in different seats.

* * * * *